(12) United States Patent
Ezrielev et al.

(10) Patent No.: US 12,489,798 B2
(45) Date of Patent: Dec. 2, 2025

(54) MANAGING ARTIFICIAL INTELLIGENCE MODELS TO IDENTIFY GOALS OF MALICIOUS ATTACKERS

(71) Applicant: Dell Products L.P., Round Rock, TX (US)

(72) Inventors: Ofir Ezrielev, Beer Sheva (IL); Tomer Kushnir, Omer (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 18/459,126

(22) Filed: Aug. 31, 2023

(65) Prior Publication Data
US 2025/0080587 A1   Mar. 6, 2025

(51) Int. Cl.
*H04L 9/40* (2022.01)
*H04L 29/06* (2006.01)

(52) U.S. Cl.
CPC ........ *H04L 63/205* (2013.01); *H04L 63/1491* (2013.01); *H04L 2463/145* (2013.01)

(58) Field of Classification Search
CPC ............. H04L 2463/145; H04L 63/205; H04L 63/1491; H04L 63/1408; H04L 63/1416; H04L 63/1433; H04L 63/1441; G06F 21/55; G06F 21/554; G06F 21/577
See application file for complete search history.

(56) References Cited

U.S. PATENT DOCUMENTS

| 6,922,816 B1 | 7/2005 | Amin et al. |
| 10,936,173 B2 | 3/2021 | Ubillos et al. |
| D917,546 S | 4/2021 | Mayler et al. |

(Continued)

FOREIGN PATENT DOCUMENTS

| EP | 4481632 A1 | 12/2024 |
| KR | 20250011365 A | 1/2025 |

(Continued)

OTHER PUBLICATIONS

Anastasovski, Goce, "Classification of Malicious Web Traffic" (2013). Graduate Theses, Dissertations, and Problem Reports. 153. (118 Pages).

(Continued)

*Primary Examiner* — Edward Zee
(74) *Attorney, Agent, or Firm* — WOMBLE BOND DICKINSON (US) LLP

(57) ABSTRACT

Methods and systems for managing an artificial intelligence (AI) model are disclosed. An AI model may be part of an evolving AI model pipeline, the processes of which may include obtaining training data from data sources used to update the AI model. An attacker may introduce poisoned training data via one or more of the data sources as a form of attack on the AI model. When the poisoned training data is identified, the poisoned training data may be compared to existing training data to determine the attacker's goal. Based on the attacker's goal, remedial actions may be performed that may update operation of pipeline. The updated operation of the pipeline may reduce the computational expense for remediating impact of the poisoned training data, and may reduce the likelihood of obtaining poisoned training data in the future.

20 Claims, 11 Drawing Sheets

(56) References Cited

U.S. PATENT DOCUMENTS

| | | | |
|---|---|---|---|
| 11,030,709 | B2 | 6/2021 | McLinden et al. |
| 11,449,942 | B2 | 9/2022 | Basu et al. |
| 11,460,997 | B2 | 10/2022 | Homma et al. |
| 11,783,025 | B2 | 10/2023 | Molloy |
| 2018/0293516 | A1 | 10/2018 | Lavid Ben Lulu |
| 2021/0089941 | A1 | 3/2021 | Chen |
| 2021/0209512 | A1 | 7/2021 | Gaddam |
| 2021/0224684 | A1 | 7/2021 | Sarkar |
| 2022/0027792 | A1 | 1/2022 | Cummings |
| 2022/0078637 | A1 | 3/2022 | Tullberg |
| 2022/0300857 | A1 | 9/2022 | Lavid Ben Lulu |
| 2023/0030136 | A1 | 2/2023 | Lancioni |
| 2023/0032822 | A1 | 2/2023 | Wang |
| 2023/0198855 | A1 | 6/2023 | Ganesan |
| 2023/0205158 | A1 | 6/2023 | Ramanasankaran |
| 2023/0368074 | A1 | 11/2023 | Mallya Kasaragod |
| 2024/0134972 | A1 | 4/2024 | Boué |
| 2024/0185090 | A1 | 6/2024 | Rafferty |
| 2024/0195826 | A1* | 6/2024 | Mathews ............... G06N 20/20 |
| 2024/0250975 | A1 | 7/2024 | Pourahmadi |
| 2024/0273184 | A1* | 8/2024 | Yarabolu ............... G06F 21/55 |
| 2024/0394419 | A1 | 11/2024 | Patzlaff |
| 2025/0013913 | A1 | 1/2025 | Boué |

FOREIGN PATENT DOCUMENTS

| | | |
|---|---|---|
| WO | 2020/123985 A | 6/2020 |
| WO | 2021167733 A1 | 8/2021 |
| WO | 2022115623 A1 | 6/2022 |

OTHER PUBLICATIONS

Joshi, Naveen, "Is The Data Used For Training Your Machine Learning Model Safe?" Technology For You, Jul. 28, 2022, Web Page <https://www.technologyforyou.org/is-the-data-used-for-training-your-machine-learning-model-safe/> accessed on Sep. 1, 2022 (3 Pages).

Di, Jimmy Z., et al. "Hidden poison: Machine unlearning enables camouflaged poisoning attacks." NeurIPS ML Safety Workshop. 2022. (28 Pages).

Wang, Siruo, et al., "Methods for correcting inference based on outcomes predicted by machine learning." Proceedings of the National Academy of Sciences 117.48 (2020): 30266-30275. (10 Pages).

Rauschmayr, Nathalie, et al., "Detecting and analyzing incorrect model predictions with Amazon SageMaker Model Monitor and Debugger," Amazon Web Services, Jul. 9, 2020, Web Page <https://aws.amazon.com/blogs/machine-learning/detecting-and-analyzing-incorrect-model-predictions-with-amazon-sagemaker-model-monitor-and-debugger/> accessed on Sep. 1, 2022 (13 Pages).

Jackson Higgins, Kelly, "Honeypot Stings Attackers With Counter-attacks," DarkReading, Mar. 26, 2013, Web Page <https://www.darkreading.com/vulnerabilities-threats/honeypot-stings-attackers-with-counterattacks> accessed on Sep. 1, 2022 (4 Pages).

Susmelj, Igor, "The Data You Don't Need: Removing Redundant Samples," Towards Data Science, Mar. 19, 2020, Web Page <https://towardsdatascience.com/the-data-you-don-t-need-removing-redundant-samples-6bfd07c1516c> accessed on Sep. 1, 2022 (10 Pages).

Aghakhani, Hojjat, et al. "Bullseye polytope: A scalable clean-label poisoning attack with improved transferability." 2021 IEEE European symposium on security and privacy (EuroS&P). IEEE, 2021. (20 Pages).

Zhibo Wang et al., "Threats to Training: A Survey of Poisoning Attacks and Defenses on Machine Learning Systems." ACM Computing Surveys, vol. 55, No. 7, Article 134. Dec. 2022: pp. 1-36. (Year: 2022).

Naveen Joshi, "Is The Data Used for Training Your Machine Learning Model Safe", Technology For You. Jul. 28, 2022, Retrieved from <https://www.technologyforyou.org/is-the-data-used-for-training-your-machine-learning-model-safe/> dated Sep. 1, 2022 (3 pages).

* cited by examiner

MANAGING ARTIFICIAL INTELLIGENCE MODELS TO IDENTIFY GOALS OF MALICIOUS ATTACKERS

FIELD

Embodiments disclosed herein relate generally to artificial intelligence (AI) models. More particularly, embodiments disclosed herein relate to systems and methods to manage AI models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
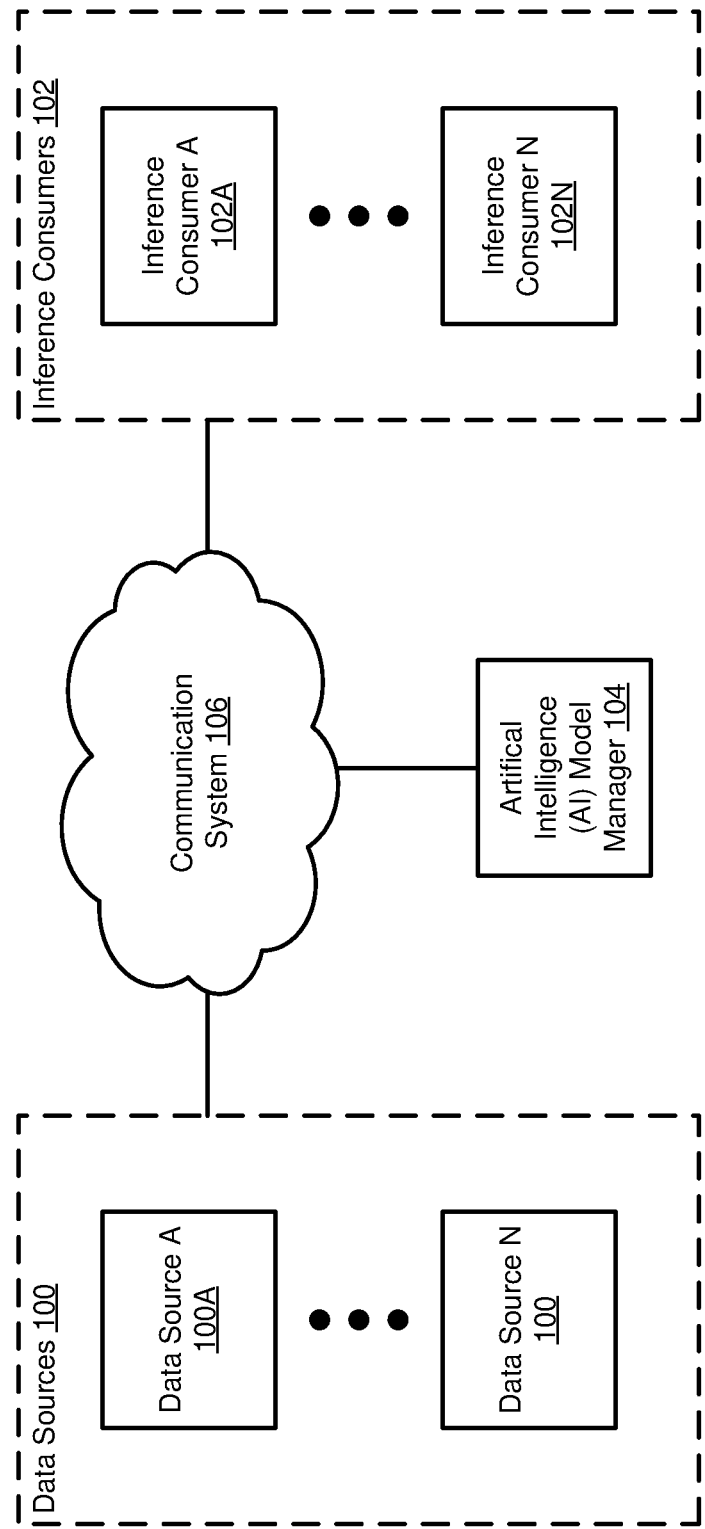
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing AI models. Trained AI models may provide computer-implemented services (e.g., inference generation) for downstream consumers (e.g., inference consumers, which may provide computer-implemented services using the inferences).

The AI models may be part of a pipeline (e.g., an evolving AI model pipeline) that may be operated by a data processing system. The pipeline may include operations that collect data (e.g., training data) from various data sources participating in the pipeline. Over time, the AI model may be updated as part of the operation of the pipeline, through a training process using the training data. However, an attacker (e.g., a malicious entity) may initiate an attack on the AI model by introducing poisoned training data to the pipeline (e.g., to the AI model).

When poisoned training data is introduced to an AI model, the AI model may become untrustworthy (e.g., the AI model may be tainted by the poisoned training data). Inferences generated using the tainted AI model may also be untrustworthy or inaccurate (e.g., poisoned inferences).

If an AI model has been tainted with poisoned training data, then the model may require re-training to remove the influence of the poisoned training data, and any or all inferences generated using the tainted AI model may be untrustworthy. Training an AI model may be a computationally expensive process and may require the use of a limited amount of computing resources that may otherwise be used for inference generation. In other words, computing resources spent re-training AI models may interrupt inference generation, consumption, and/or other types of computer-implemented services that may otherwise be provided using the computing resources dedicated to re-training.

In addition, once the AI model is retrained, any and/or all inferences provided to inference consumers using the tainted AI model may require replacement. Inference generation may be required for an entire ingest dataset, prompting another inefficient use of computing resources.

To reduce computing resources spent re-training AI models, an AI model snapshot may be obtained periodically throughout the AI model training process. The snapshot may store information regarding the structure of the AI model, which may be used to restore a partially trained untainted AI model. The restored AI model may require training using only a subset of the original training dataset, thereby requiring fewer computational resources than re-training an AI model from scratch using the entire training dataset. Thus, reverting to a last known good AI model may require less resource expenditure than re-training an AI model from scratch.

The snapshot may also store information regarding poisoned inferences obtained from the tainted AI model. This information may be used to (i) identify poisoned inferences generated from the tainted AI model, (ii) replace poisoned inferences already provided to the inference consumer, (iii) identify poisoned training data being used to train the tainted AI model, and/or (iv) identify the data sources supplying the poisoned training data. By identifying the poisoned inferences, only a portion of the ingest dataset may be required to generate replacement inferences.

In addition to snapshots, new training data may be screened prior to use for AI model training. The new training data may be screened as part of the pipeline operations, using various methods, including directed modification analysis. For example, the directed modification analysis may identify whether newly obtained training data has likely been synthesized using previously used training data. If it is determined that the newly obtained training data is likely synthetic, then the newly obtained training data may be treated as being poisoned. If poisoned, then the newly obtained training data may be excluded to avoid tainting AI model instances. In addition, the suspected poisoned training data and the previously used training data may be used for further analysis of the attack.

Specifically, a malicious entity may have a particular goal (e.g., to reinforce and/or dilute an existing trend in the existing training data). The goal may be identified by evaluating portions of existing training data on which potentially poisoned portions of new training data are based. Once a likely goal is identified, a remedial action set may be chosen based on the goal.

By doing so, embodiments disclosed herein may provide a system for managing an AI model (e.g., of an evolving AI model pipeline) that reduces (i) the likelihood of tainting the AI model with poisoned training data, (ii) the likelihood of generating poisoned inferences, and/or (iii) other negative impacts of introducing poisoned training data into the pipeline. By identifying the malicious entity's goal (e.g., based on an analysis of the new training data and existing training data), effective remedial actions may be performed to thwart (or otherwise mitigate) current attacks and/or to prevent future attacks.

Consequently, the computing resources expended for managing AI models may be reduced. Thus, the disclosed embodiments may address, in addition to other challenges, the technical problem of limited computing resources available for providing computer-implemented services. The disclosed embodiments may address this technical problem by reducing consumption of computing resources for remediating poisoned inferences, thereby improving the availability of computing resources for other purposes such as providing computer-implemented services.

In an embodiment, a method for managing an artificial intelligence (AI) model is provided. The method may include: making an identification that a portion of new training data for the AI model is poisoned training data, the AI model being part of an evolving AI model pipeline; and based on the identification: identifying a portion of existing training data on which the portion of the new training data is based; for a sample of the portion of the new training data, identifying at least one sample of the existing training data upon which the sample of the portion of the new training data is based; identifying at least one label for the at least one sample; identifying a goal of a malicious entity using the at least one label for the at least one sample; and performing a remedial action set to update operation of the evolving AI model pipeline based on the goal.

Identifying the at least one sample of the existing training data upon which the sample of the portion of the new training data is based may include: for the sample of the portion of the new training data: identifying a first sample of the existing training data that comprises a portion that is substantially similar to a first portion of the sample of the portion of the new training data; and identifying a second sample of the existing training data that comprises a portion that is substantially similar to a second portion of the sample of the portion of the new training data.

The first portion of the sample of the portion of the new training data may be a first portion of a first image, and the second portion of the sample of the portion of the new training data may be a second portion of the first image.

The first sample may be a second image, the second sample may be a third image, and a first label of the at least one label indicates a first depiction in the second image and a second label of the at least one label indicates a second depiction in the third image.

Identifying the goal of the malicious entity may include: classifying the goal based on a level of matching of the first label and the second label.

Classifying the goal may include: comparing the level of matching of the first label and the second label to a threshold; in a first instance of the comparing where the level of matching exceeds the threshold: concluding that the goal is to reinforce an existing trend in the existing training data; and in a second instance of the comparing where the level of matching does not exceed the threshold: concluding that the goal is to dilute an existing trend in the existing training data.

The evolving AI model pipeline may provide inferences to inference consumers using AI models, and the new training data may have been scheduled for use in updating the AI models prior to the identification being made.

In an embodiment, a non-transitory media is provided. The non-transitory media may include instructions that when executed by a processor cause the method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services that may utilize AI models as part of the provided computer-implemented services.

The AI models may include, for example, linear regression models, neural network models, and/or other types of AI models. The AI models may be used for various purposes. For example, the AI models may be trained to recognize patterns, automate tasks, and/or make decisions.

The computer-implemented services may include any type and quantity of computer-implemented services. The computer-implemented services may be provided by, for example, data sources 100, AI model manager 104, inference consumers 102, and/or any other type of devices (not shown in FIG. 1). Any of the computer-implemented services may be performed, at least in part, using AI models and/or inferences obtained with the AI models.

Data sources 100 may obtain (i) training data usable to train AI models, and/or (ii) ingest data that is ingestible into trained AI models to obtain corresponding inferences. The ingest data may also be used to train the AI models. The AI models may be part of an evolving AI model pipeline. For example, the evolving AI model pipeline may include processes that may (i) obtain and/or train (e.g., update) AI models, (ii) obtain inferences using the trained AI models, and/or (iii) perform other operations that may be used to provide computer-implemented services using the AI models (e.g., AI model testing, detecting and/or analyzing poisoned training data, etc.).

To manage the AI models, AI model manager 104 may (i) initiate the training of an instance of an AI model using the training data, and/or (ii) obtain inferences using a trained AI model instance and the ingest data. Both of these tasks may consume computing resources. AI model manager 104 may have access to a finite number of computing resources (e.g., processors, memory modules, storage devices, etc.), and/or may determine at any point in time which computing resources should be allocated to training an instance of the AI model, using the AI model to generate inferences, and/or any other task related to AI models.

Inference consumers 102 may provide, all or a portion, of the computer-implemented services. When doing so, inference consumers 102 may consume inferences obtained by AI model manager 104 (and/or other entities using AI models managed by AI model manager 104) and/or other entities using AI models managed by AI model manager 104. However, if inferences from AI models are unavailable, then inference consumers 102 may be unable to provide, at least in part, the computer-implemented services, may provide less desirable computer-implemented services, and/or may otherwise be impacted in an undesirable manner. For example, if AI model manager 104 is providing inferences relied upon by inference consumers 102, then inference consumers 102 may be deprived of the inferences when the limited computing resources of AI model manager 104 are allocated to training an AI model instance rather than obtaining inferences.

Over time, new versions of the AI model may be obtained. The new versions of the AI models may be obtained, for example, due to requests from inference consumers 102, acquisition of additional training data that may improve the accuracy of inferences provided by the AI models, and/or for other reasons.

To obtain the new versions of the AI models, existing AI models may be used as a basis for new AI models thereby leveraging the existing resource expenditures used to obtain the existing AI models. For example, updating instances of the AI models may be obtained through training as more training data is obtained (e.g., incremental learning).

Training of AI models may be computationally costly because training may require significant resource expenditures. In addition, the introduction of malicious or poisoned training data can in turn, poison (i) the new AI model instance, (ii) any inferences obtained from the poisoned AI model instance, and (iii) other AI model instances derived from the new AI model instances that are poisoned.

In general, embodiments disclosed herein may provide methods, systems, and/or devices for managing AI models. The AI models may be managed in a manner that allows for the impact of poisoned training data to be prevented and/or remediated in a computationally efficient manner. By doing so, the system may be more likely to be able to provide desired computer-implemented services due to improved access to computing resources.

To manage a trained instance of an AI model, the system of FIG. 1 may include AI model manager 104. AI model manager 104 may (i) obtain an AI model, (ii) obtain a training dataset or an ingest dataset, (iii) obtain a trained AI model instance, (iv) obtain an inference from the trained AI model instance, (v) provide access to the inference to other entities, (vi) update the AI model over time when update conditions indicate that the AI model should be updated (e.g., such as availability of additional training data), (vii) generate snapshots for the AI model as it is updated over time, and (viii) remediate the AI model when poisoned training data has been used to update the AI model.

The snapshots generated throughout the life of the AI model may include full snapshots and/or incremental snapshots. A full snapshot of an AI model at a given time may include any or all information required to rebuild the AI model for the given time (e.g., the entire AI model structure, all neuron weights, all connections, etc.). However, an incremental snapshot of an AI model at a given time may only include a subset of the information stored in the full snapshot (e.g., only the neuron weights that have changed since the last full snapshot). Using incremental snapshots may improve efficiency as they may use fewer computing resources (e.g., data transfer and/or data storage) than a full snapshot.

Generating snapshots of the AI model over time may allow for the impact of poisoned data to be computationally efficiently mitigated. Generating snapshots of the AI model over time may also allow for (i) the identification of poisoned training data, (ii) the impact of poisoned training data to be computationally efficiently mitigated, and/or (iii) the management of data sources supplying poisoned training data (e.g., a malicious entity may supply poisoned training data via a data source as part of an attack on the AI model).

Identifying poisoned training data prior to use of newly obtained training data to update the AI model may prevent poisoning of the AI model (and poisoning of future inferences generated by the updated AI model). To identify whether newly obtained training data includes poisoned training data, the newly obtained training data may be subject to a directed modification analysis. During the directed modification analysis, the new training data may be analyzed based on previously obtained training data to identify whether any of the training data is likely synthetic. For example, one avenue that a malicious entity may take to attack an AI model may be through generation of synthetic training data based on training data upon which an AI model has been previously trained. The synthetic training data may make a subsequently trained AI model less able to generate accurate inferences (e.g., by moving decision boundaries and/or making the aggregate training data less clear).

For example, a malicious entity may combine two portions of previously used training data, add noise, and/or perform other operations to obtain synthetic training data. The synthetic training data may muddy distinguishing features between the two portions of the previously used training data, thereby causing a new (and/or updated) AI model instance trained using the synthetic training data to be less able to distinguish new ingest data as being similar to one or other of the two portions of the previously used training data.

If new training data likely includes synthetic training data, the new training data may be excluded from training of AI model instances. Consequently, AI model instances may be less likely to be poisoned (e.g., tainted by training using poisoned training data).

However, some types of poisoned training data may not be detectable via directed modification analysis. Consequently, other methods of detecting poisoned training data may be implemented. At least one of these methods may be retrospective. Accordingly, in some cases, poisoned training data may be identified after it has been used to update AI models.

When a portion of new training data for an evolving AI model pipeline is identified as poisoned training data, AI model manager 104 may (i) identify a portion of existing training data on which the portion of the new training data is based, (ii) for a sample of the portion of the new training data, identify at least one sample of the existing training data upon which the sample of the portion of the new training data is based, (iii) identify at least one label for the at least one sample, (iv) identify a goal of a malicious entity using the at least one label for the at least one sample, and/or (v) perform a remedial action set to update operation of the evolving AI model pipeline based on the goal.

For example, the sample of the portion of the new training data may be an image. A first portion of the image may include half of a depiction of a cat and a second portion of the image may include half of a depiction of a dog. The image may have an associated label indicating that the image collectively depicts a cat. As the image does not exclusively include features associated with a cat, this image may be a synthetic image generated with the goal of reducing the AI model's ability to identify images of cats.

Generating original images from which to base the synthetic image on may be a computationally costly process. Therefore, the attacker may be more likely to generate synthetic images based on labeled images already included in previous training data sets.

Consequently, the portion of the existing training data on which the portion of the new training data is based may be identified by comparing the image to a series of images included in the existing training data. The portion of the existing training data on which the portion of the new training data is based may include two images. A first image of the two images may depict a cat and may have a corresponding first label indicating that the first image depicts a cat. A second image of the two images may depict a dog and may have a corresponding second label indicating that the second image depicts a dog.

A level of matching between the first label and the second label may be determined and compared to a threshold to identify a goal of the attacker. If the level of matching exceeds the threshold, the goal may be expected to include reinforcing an existing trend in the existing training data. If the level of matching does not exceed the threshold, the goal may be expected to include diluting an existing trend in the existing training data.

Continuing with the previous example regarding images of cats and dogs, the level of matching between the first label and the second label may not exceed the threshold. Therefore, it may be concluded that the malicious entity intended to dilute the AI model's ability to predict labels for images of dogs and cats.

To mitigate the impact of poisoned training data previously used to update the AI models, AI model manager 104 may obtain a poisoned data notification (e.g., from an entity that has identified that previously used training data, in fact, includes poisoned training data). When a poisoned data notification is identified, AI model manager 104 may use the snapshots to (i) revert an existing AI model instance to a previous AI model instance that is not tainted by the poisoned data, (ii) update the previous AI model instance to obtain an updated AI model instance that is not tainted by the poisoned data, (iii) identify poisoned inferences provided by the existing AI model inference (and/or previous versions that were also tainted by the poisoned data), (iv) obtain replacement inferences using the updated AI model instance, (v) delete the identified poisoned inferences, (vi) notify inference consumers 102 of the poisoned inferences, and/or (vii) flag (e.g., quarantine) a data source that has supplied the poisoned training data (e.g., to prevent the collection of poisoned training data in the future).

By doing so, embodiments disclosed herein may reduce inference supply interruptions to inference consumers 102 by (i) reducing the likelihood of poisoned training data being used to update AI models and (ii) reducing computing resources used for retraining tainted AI models even when poisoned training data has been used to update AI models.

In order to obtain a trained AI model instance, AI model manager 104 may obtain an AI model and a training dataset. The training dataset may be obtained through one or more data sources 100. Data sources 100 may include any number of data sources (e.g., 100A, 100N). For example, an AI model may be used to provide a type of facial recognition service. For example, the AI model may be used to identify whether persons are wearing masks in an image or video. In this example, the AI model may be a deep learning model type and data sources may include multiple social media platforms. A training dataset may be created by collecting images or video of persons wearing masks and persons not wearing masks. The training dataset may then be used to train an instance of the AI model.

Further, in order to obtain an inference from the trained AI model instance, other data may be collected from the same data sources 100 or another data source. Continuing with the above example, another data source 100 may be a security camera. The ingest dataset may include images or video of a person. An inference (e.g., an identification of whether or not the person is wearing a mask) may be obtained from the trained instance of the AI model after ingesting the ingest dataset (e.g., may be used for inferencing and training purposes), and the inference may be distributed to inference consumers 102.

Inference consumers 102 may include any number of inference consumers (e.g., 102A, 102N). Inference consumers 102 may include businesses, individuals, or computers that may use the inference data to improve and/or automate decision-making.

While the example supplied is with respect to AI facial (e.g., mask) recognition, it will be appreciated that an AI model may be used to achieve other types of goals.

When performing its functionality, one or more of AI model manager 104, data sources 100, and inference consumers 102 may perform all, or a portion, of the methods and/or actions shown in FIGS. 2A-3D.

Any of AI model manager 104, data sources 100, and inference consumers 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of AI model manager 104 and any of the data sources 100 and inference consumers 102).

While illustrated in FIG. 1 as included a limited number of specific components, a system in accordance with an embodiment may include fewer, additional, and/or different components than those illustrated therein.

The system described in FIG. 1 may be facilitate performance of computer-implemented services using inferences. In FIGS. 2A-2E data flow diagrams in accordance with an embodiment are shown that may be performed by the system in FIG. 1 when providing this functionality.

Figure 2A:
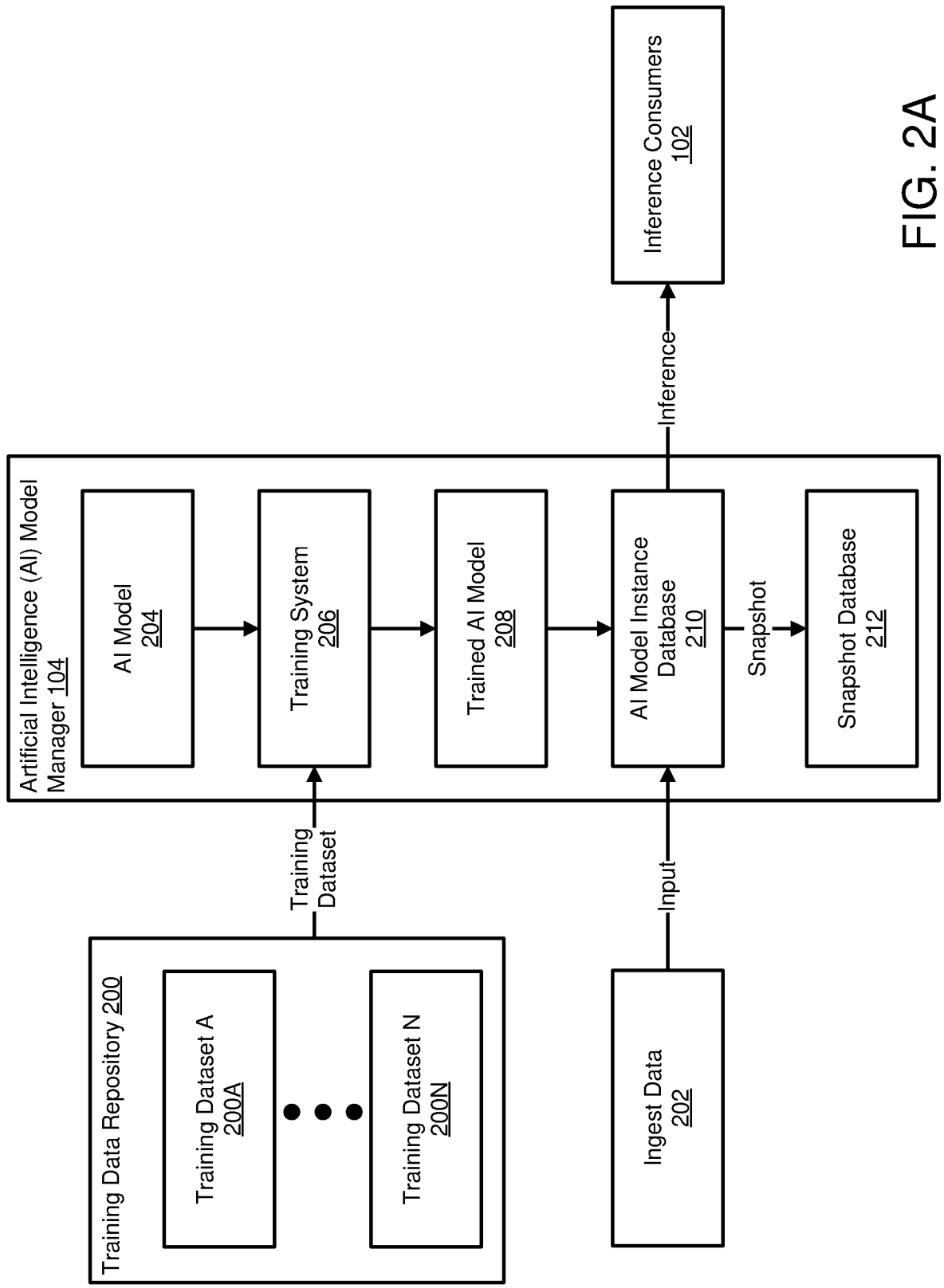
FIG. 2A shows a data flow diagram illustrating an AI model management system in accordance with an embodiment.

Turning to FIG. 2A, a first data flow diagram in accordance with an embodiment is shown. The first data flow diagram may illustrate the generation and use of AI models in a system similar to that of FIG. 1. As noted with respect to FIG. 1, the AI models may be used to obtain inferences, which may be used to provide computer-implemented services. For example, inference consumers 102 may consume mask recognition services for images or video to identify whether persons are attempting to conceal their identities using masks. These services may be provided by using AI models that have been trained using self-supervised learning or other learning processes to classify persons as either wearing or not wearing masks.

As discussed with respect to FIG. 1, training data used for training AI models may be obtained from any number of data sources 100. Training data may be stored in training data repository 200. Training data repository 200 may include any number of training datasets (e.g., 200A, 200N).

Training data repository 200 may include labeled data and/or unlabeled data, depending on the self-supervised learning implementation implemented by AI model manager 104. For example, in the context of mask recognition, training data repository 200 may include images or video of persons that are labeled (e.g., with mask or without mask), and other images or video of persons that are unlabeled with respect to whether or not a mask is being worn by the respective persons. The unlabeled data may be collected via ingest data 202 acquisition, used for inferencing, and may be subsequently used to supplement training data repository 200.

Data sources 100 may provide ingest data 202. Ingest data 202 may be a portion of data for which an inference is desired to be obtained. Ingest data 202 may not be labeled data and, thus, an association for ingest data 202 may not be known. For example, returning to the mask detection services example, ingest data 202 may include images of persons without labels indicating whether the persons are wearing masks. Ingest data 202 may be used by AI model manager 104 to obtain a classification for the depicted persons regarding whether they are wearing masks (a downstream consumer may use the classification to, for example, issue a security alert or take other type of action).

AI model manager 104 may provide inferences for ingest data, such as ingest data 202. To do so, AI model manager 104 may include AI model 204 and training system 206. AI model 204 may be trained by training system 206 using one or more training datasets (e.g., training dataset 200A). For example, training system 206 may employ self-supervised learning using a training dataset that includes labeled and/or unlabeled data.

Once trained, trained AI model 208 may attempt to map ingest data to the desired output data (e.g., a mask classification), as well as make inferences based on ingest data 202 that may differ from the training data used to train trained AI model 208. In the context of the mask recognition services example, trained AI model 208 may be a trained mask recognition AI model, trained to map the depictions of persons in images to classifications reflect whether the person in the images is wearing a mask.

To provide mask recognition services, AI model manager 104 may train any number of AI models which may generate inferences usable to identify persons in images. To manage the trained AI models, the trained AI models (e.g., including trained AI model 208 and/or other trained AI models) may be stored in AI model instance database 210. AI model instance database 210 may include any number of trained AI model instances (e.g., trained AI model 208, other trained AI models that are not shown in FIG. 2A).

To generate inferences using the trained AI models, AI model instance database 210 (and/or other entities not shown) may receive ingest data 202. Ingest data 202 may be used to select one or more trained AI models to use to infer the mask wearing status of persons depicted in ingest data 202.

Once selected, ingest data 202 may be input to a trained AI model instance to generate an inference. AI model manager 104 may obtain the inference, which may be provided to inference consumers 102. In the mask recognition example, an image depicting a person may be input to the trained mask recognition AI model, and a mask status classification for the person may be obtained by AI model manager 104, and the mask status classification for the person may be provided to an inference consumer such as a loss prevention system of a business.

Over time, the AI models of AI model instance database 210 may need to be updated for a variety of reasons. For example, the trained AI models may become inaccurate, may not provide desired types of inferences, etc. Consequently, the trained AI models of AI model instance database 210 may be replaced and/or updated.

To reduce the likelihood of replacement or updating of trained AI models resulting in undesired outcomes (e.g., due to poisoning), snapshots for the trained AI models may be obtained prior to further training. AI model manager 104 may obtain a snapshot of a trained AI model instance from AI model instance database 210. The snapshot may be stored by snapshot database 212. The snapshot may be stored by snapshot database 212 by: sending the snapshot to snapshot database 212, and storing the snapshot in a non-transitory storage medium.

Snapshot database 212 may include any number of snapshots of AI model instances. The snapshots of the AI model instances may include information regarding the structure of an AI model instance, information regarding inferences obtained from the AI model instance, and/or information regarding the training datasets used to train the AI model instance (e.g., the data sources that supply the training datasets).

Thus, as illustrated in FIG. 2A, the system of FIG. 1 may provide inferences using trained AI models. However, as noted above, if the trained AI models are poisoned then the trained AI models may no longer be trustworthy for inference generation. AI model manager 104 may manage inference generation when tainted trained AI models are identified, using the snapshots of snapshot database 212 to computationally efficiently restore inference generation functionality, manage poisoned inferences, and/or otherwise mitigate the impact of poisoned training data.

Figure 2B:
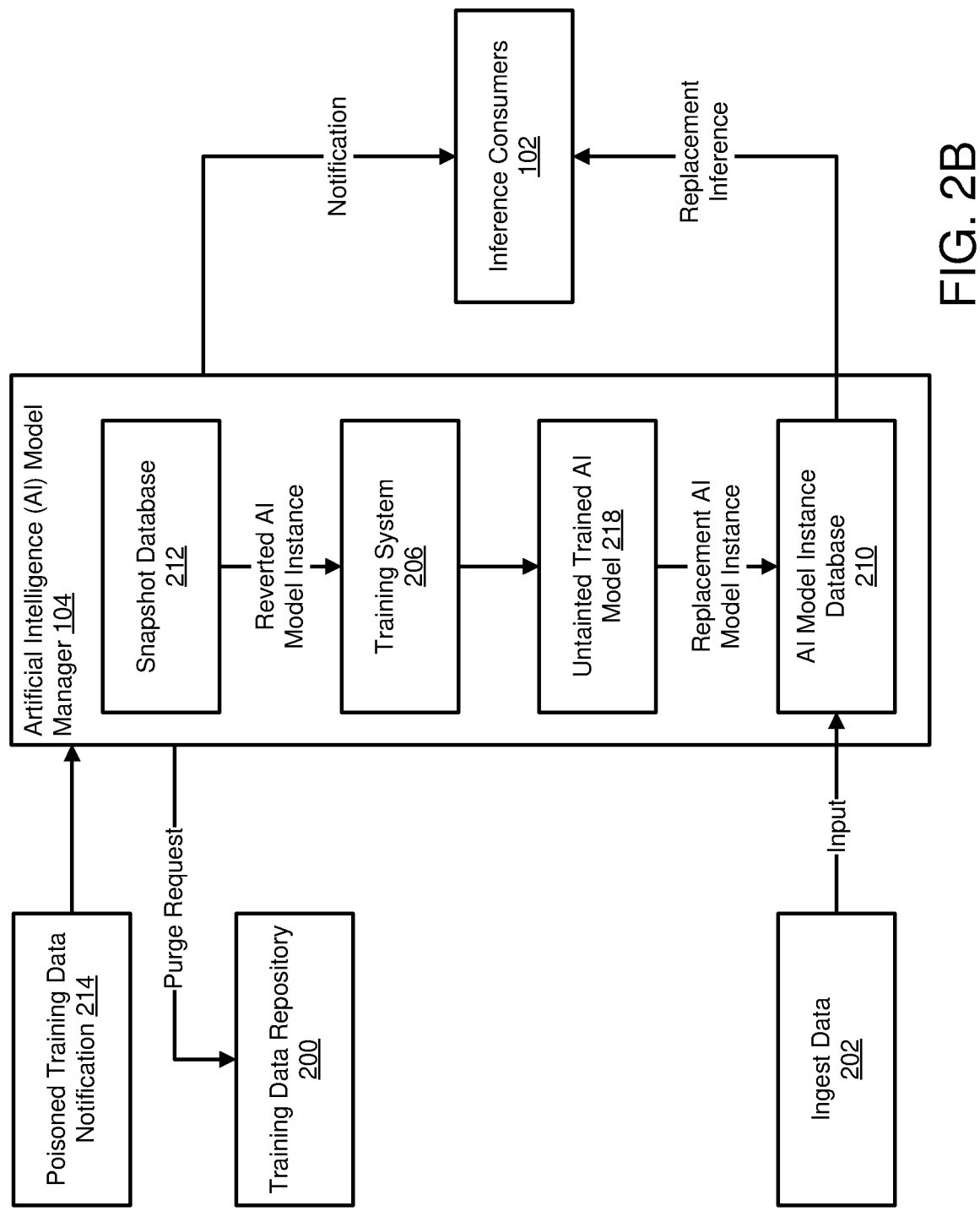
FIG. 2B shows a data flow diagram illustrating an AI model management system managing poisoned training data in accordance with an embodiment.

Turning to FIG. 2B, a second data flow diagram in accordance with an embodiment in shown. In the event that a poisoned training dataset is identified (e.g., after being used to train an AI model, refer to FIG. 2D for additional details regarding prevention of using poisoned training data for training of AI models), AI model manager 104 may obtain poisoned training data notification 214. Poisoned training data notification 214 may be generated using information in snapshot database 212 or other data sources, either internally, or by another source and/or device. Poisoned training data notification 214 may include information that identifies components associated with a trained AI model that are impacted by poisoned training data used to obtain the trained AI model.

The components may include (i) a poisoned portion of a training dataset, (ii) a tainted trained AI model instance associated with the poisoned portion of the training dataset (e.g., identifiers, (iii) a time period associated with the poisoning (e.g., the time when the poisoned training data is obtained from data sources 100, introduced to the AI model through training, and/or the time the poisoning is remediated), (iv) a poisoned inference associated with the tainted AI model instance, (v) an inference consumer that consumed the poisoned inference, and/or (vi) one or more data sources that provided the poisoned training data.

For example, in the context of mask recognition services, a poisoned portion of a training dataset may be an image that has been synthesized by a malicious attacker based on previously used training data. The synthesized image may include portions derived from two images that respectively depict a person wearing and not wearing a mask. In this example, the injection of the synthetic image may blur the lines between persons that are and are not wearing masks thereby reducing the ability of a trained AI model to make mask status determinations.

To attempt to hide their malicious activities, other portions of the synthetic image may include or be derived from other training data. Consequently, simple pattern matching against previously used training data may be insufficient to identify whether new training data is malicious (e.g., synthetic). As will be discussed with respect to FIG. 2D, a directed modifications analysis may be likely to successfully discriminate synthetic training data from legitimate training data.

Once the components are identified and to mitigate the impact of the components, AI model manager 104 may (i) send a notification to inference consumers 102 regarding the poisoned inference, (ii) send a purge request to training data repository 200 regarding the poisoned portion of the training dataset, and/or (iii) revert a tainted AI model instance to a previous AI model instance. The previous AI model instance may be a last known good AI model instance, and/or a previous tainted AI model instance trained by poisoned training data. In the case where the AI model instance is tainted, then the tainted AI model instance may later be untrained to eliminate the effect of the poisoned training data.

A snapshot of a last known good AI model instance may be stored in snapshot database 212. The last known good AI model instance may be a partially trained AI model instance that has not been trained using the poisoned portion of training data. For example, when an AI model is updated over time (e.g., when additional training data becomes available), the AI model may be sequentially updated using the additional training data. However, once trained with poisoned training data, all subsequent instances of the AI model may remain poisoned (i.e., retraining/updating may not remove the effect of the poisoned training data on the future operation of the trained AI model). The last known good AI model instance may be the last version of the AI model that is trained without using the poisoned training data for updating purposes.

However, reverting the AI model may not entirely remove the impact of the poisoned training data from the overall system operation. For example, the poisoned training data may still be present in training data repository 200. To reduce the impact of poisoned training data, a purge request may prompt the deletion of a poisoned portion of a training dataset from training data repository 200. Any number of poisoned portions of training data may be removed from training data repository 200 to create updated training data repository 216, shown in FIG. 2C. Updated training data repository 216 may not include any portions of poisoned training data. An updated training dataset from updated training data repository 216 may be used to train an untainted AI model instance that is trustworthy for inference generation.

Figure 2C:
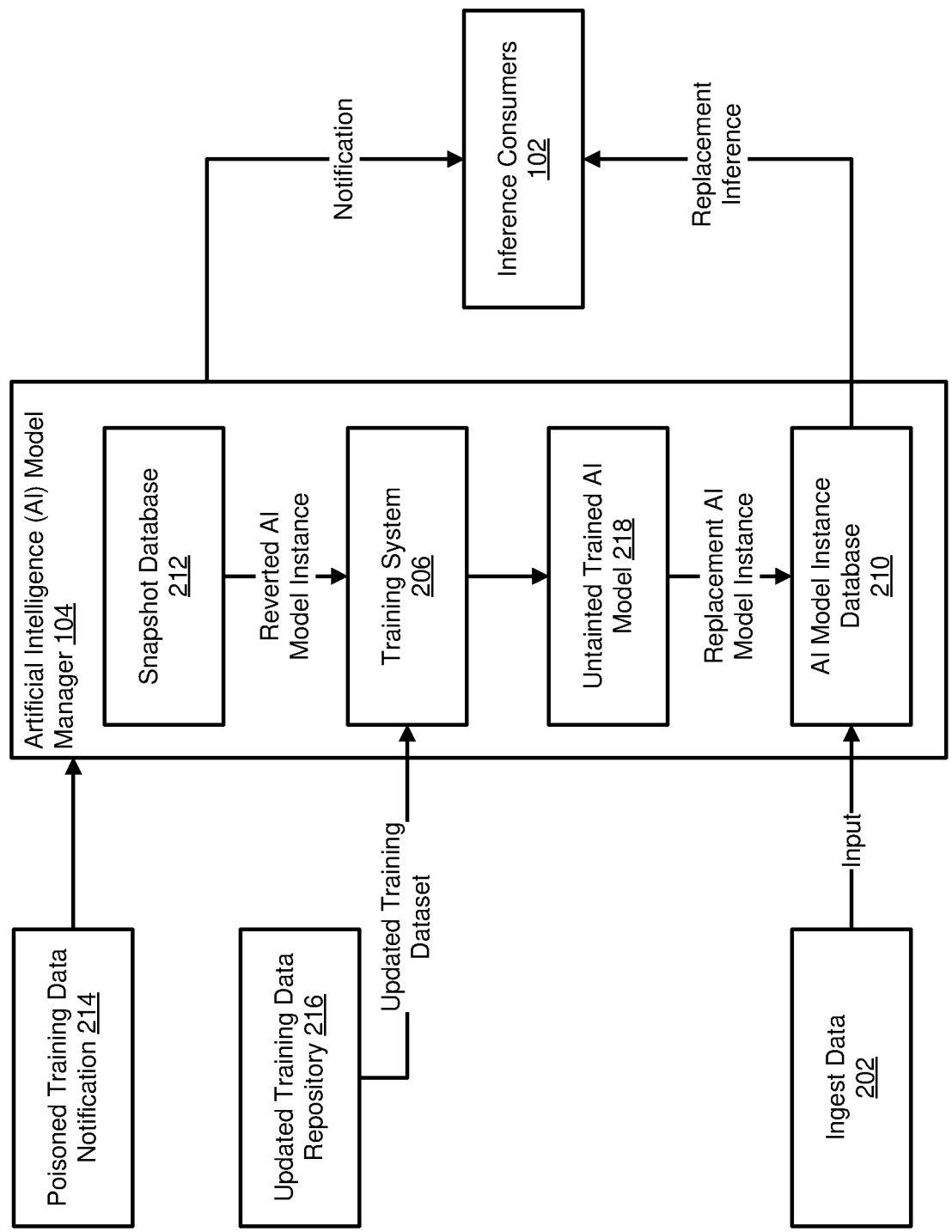
FIG. 2C shows a data flow diagram illustrating an AI model management system managing and remediating poisoned training data in accordance with an embodiment.

Turning to FIG. 2C, a third data flow diagram in accordance with an embodiment is shown. To obtain untainted trained AI model 218, training system 206 may use an updated training dataset to train a reverted AI model instance (e.g., a last known good AI model instance). To reduce computational resources expended during AI model training, the updated training dataset used to train a reverted AI model instance may only include training data not already used to train the reverted AI model instance (e.g., training data input to training system 206 after the poisoned training data was obtained). AI model manager may then replace a tainted trained AI model instance stored in AI model instance database 210 with untainted trained AI model 218.

Like removal of the poisoned training data to reduce the impact of the poisoned training data on operation of the system, untainted trained AI model 218 may be used to generate a replacement inference for a poisoned inference (e.g., generated by the tainted trained AI model) by ingesting a portion of ingest data 202 (e.g., which may have been used to generate the poisoned inference). AI model manager 104 may then provide the replacement inference to inference consumers 102 and/or otherwise use the replacement inference to reduce the impact of the poisoned inference.

For example, returning to the mask recognition services example, AI model manager 104 may send a notification to a loss prevention system regarding the incorrect identification of the mask status of a person (e.g., previously identified as wearing a mask), and training data repository 200 may be updated by removing the one or more images corresponding to the poisoned training data. Consequently, updated training data repository 216 may be used to train a reverted mask recognition AI model (e.g., a last known good mask recognition AI model) without the impact of the poisoned training data. The reverted mask recognition AI model may be trained using only the portion of images and/or video from the updated training data repository that have not been previously used to update the reverted mask recognition AI model. Once trained, the untainted mask recognition AI model may ingest new video depicting the person and send an updated identification to the loss prevention system.

While a mask recognition service example is used herein, it will be appreciated that the data flows shown in FIGS. 2A-2C may be used to achieve other types of goals without departing from embodiments disclosed herein.

Figure 2D:
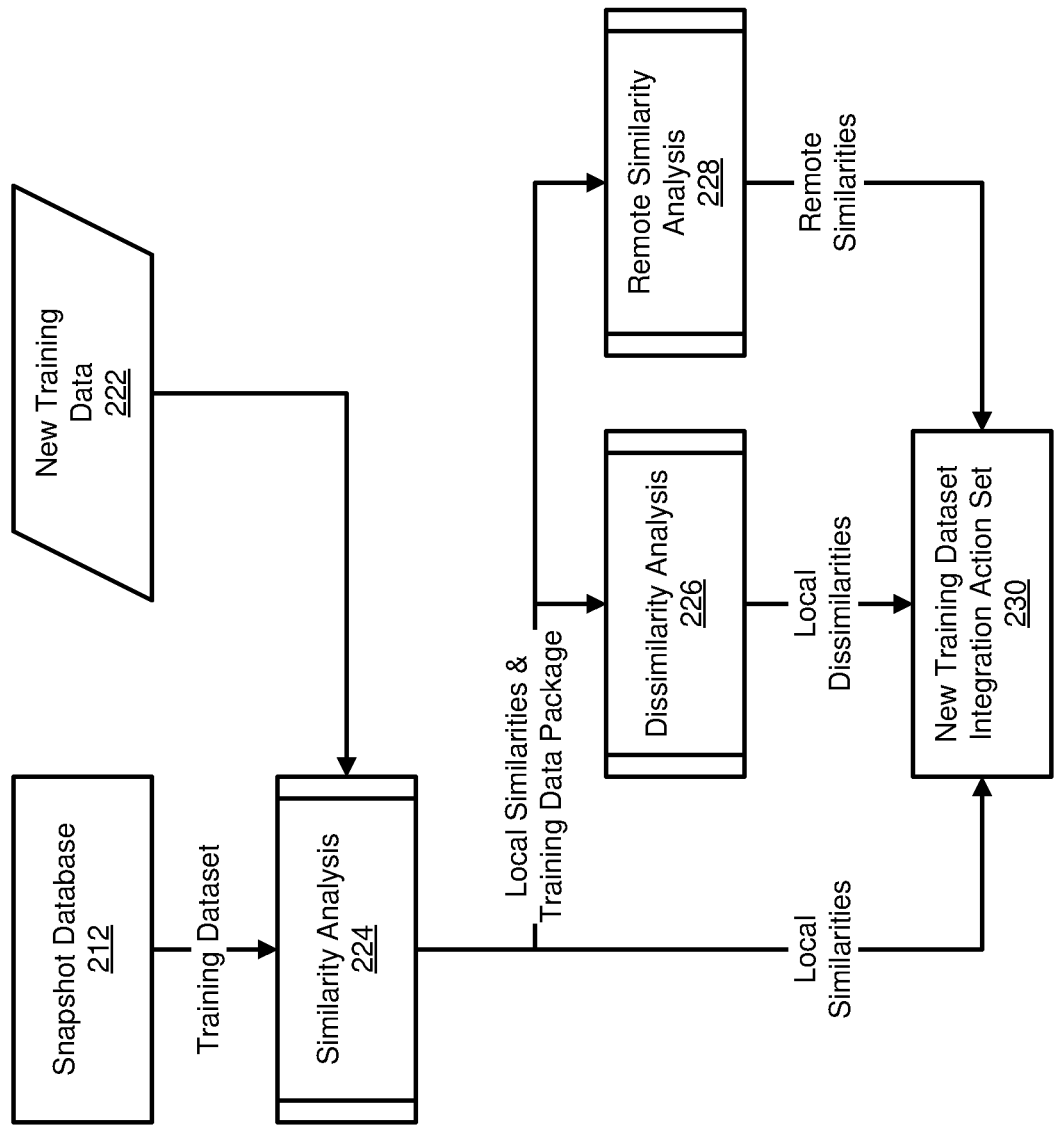
FIG. 2D shows a data flow diagram illustrating an AI model management system screening training data in accordance with an embodiment.

Turning to FIG. 2D, a fourth data flow diagram in accordance with an embodiment is shown. In addition to remediating the impact of poisoned training data, the system of FIG. 1 may also attempt to proactively prevent use of poisoned training data thereby eliminating some remediations.

When new training data 222 is obtained (e.g., that may be used to train an AI model), the system may perform an analysis to ascertain whether some or all of the new training data 222 likely includes poisoned training data.

To perform the analysis, a directed modification analysis may be performed to determine whether portions of new training data 222 are synthetic. To perform the directed modifications analysis, training data from snapshot database 212 and new training data 222 may be compared to one another. The comparison may be done on a portion-by-portion basis (e.g., image by image). The comparison may be similarity analysis 224.

During similarity analysis 224, for a portion of new training data 222, sub-portions of the new training data may be compared to sub-portions of portions of the training data from snapshot database 212 to identify any match within a predetermined threshold. The comparison may be performed via any method.

For example, the portion of the training data may be discretized into the sub-portions using a procedure that tends to divide a portion based on certain criteria. Thus, the resulting sub-portions may be likely to match (e.g., within a threshold) other sub-portions of a portion of existing training data even if the respective sub-portions are not similarly aligned within the respective portions. The criteria, in the context of image recognition, may be, for example, changes in color or collections of pixels matching a pattern.

Matching sub-portions may be treated as local similarities between the portion of new training data 222 and corresponding portions of the training data from snapshot database 212. For example, if the portion of new training data 222 is an image depicting a person with a mask covering half of a face and a similar image is present in the training dataset from snapshot database 212 but that covers the entirety of the face of the person, the two images may be treated as including a local similarity (e.g., based on the match between the sub-portions of each of the images corresponding to the mask covering half of each of the faces).

The local similarities and a training data package (e.g., new training data 222 and the training dataset from snapshot database 212) may be used to drive dissimilarity analysis 226 and remote similarity analysis 228.

During dissimilarity analysis 226, each portion of new training data 222 that is identified as including a local similarity with respect to a portion of the training dataset from snapshot database 212 may be further analyzed to identify whether any dissimilarities between other sub-portions exist between the two portions. Returning to the previous example, if the portion of new training data 222 is an image depicting a person with a mask covering half of a face and a similar image is present in the training dataset from snapshot database 212 but that covers the entirety of the face of the person, the two images may be treated as including a dissimilarity (e.g., based on the difference between the sub-portions of each of the images corresponding to the uncovered portion of one image and the covered portion of the face in the other image). Thus, a dissimilarity between two images may be treated as indicating that the portion of new training data 222 is synthetic. For example, it may be concluded that the portion was likely synthesized using the portion from snapshot database 212 and some other portion. Such images that include both local similarities and local dissimilarities may be particularly harmful to reconstructive self-supervised learning processes. Thus, through similarity analysis 224 and dissimilarity analysis 226, poisoned training data that may negatively impact such model learning processes may be identified.

During remote similarity analysis 228, each portion of new training data 222 that is identified as including a local similarity with respect to a portion of the training dataset from snapshot database 212 may be further analyzed to identify whether any similarities between other sub-portions of the portion of new training data 222 and other portions of the training dataset from snapshot database 212 exist. Returning to the previous example, if the portion of new training data 222 is an image depicting a person with a mask covering half of a face while wearing a black hat, and another image is present in the training dataset from snapshot database 212 that includes a similar hat, then the two images may be treated as including a similarity. Thus, similarities between the portion of new training data 222 and at least two different portions of the training dataset obtained from snapshot database 212 may be treated as indicating that the portion of new training data 222 is synthetic. For example, it may be concluded that the portion was likely synthesized using the two portions from snapshot database 212. Such images that include both local similarities and remote similarities may be particularly harmful to discriminatory self-supervised learning processes. Thus, through similarity analysis 224 and remote similarity analysis 228, poisoned training data that may negatively impact such model learning processes may be identified.

While described in analyses 224-228 with respect to single examples, multiple similarities between two portions of training data, dissimilarities between the two portions of training data, and similarities between multiple portions of training data may be identified and used to ascertain whether each portion of new training data 222 is likely synthetic.

Once the local similarities, dissimilarities, and remote similarities (e.g., all also referred to as analysis results) are identified, new training dataset integration action set 230 may be performed. For example, the local similarities, local dissimilarities, and remote similarities may be used to identify (i) whether portions of new training data 222 are synthetic, and (ii) the actions to perform with respect to each of the portions of new training data 222.

Portions identified as likely being synthetic may, for example, be excluded from integration into training data repositories and/or use in training AI models. In this manner, the likelihood of introduction and use of poisoned training data may be reduced. Accordingly, the quantity of computing resources used for performing remediations due to use of poisoned training data may be reduced. To further reduce the likelihood of the introduction and use of poisoned training data, information regarding detected poisoned training data may be further analyzed. The analysis may lead to remedial actions that, once performed, may reduce the likelihood of acquiring poisoned training data.

Figure 2E:
FIG. 2E shows a data flow diagram illustrating an AI model management system managing an attack on an AI model in accordance with an embodiment.

Turning to FIG. 2E, a fifth data flow diagram in accordance with an embodiment is shown. The fifth data flow diagram may illustrate a process for managing an attack on an AI model in a system similar to that of FIG. 1. As discussed previously, poisoned training data may be introduced into an evolving AI model pipeline (e.g., referred to hereafter as a "pipeline") as a form of attack on one or more AI models generated and/or used as a part of the pipeline.

To determine an appropriate remedial action set to perform in response to identifying the presence of poisoned training data in new training data 222, a goal of the attacker may be inferred based on new training data 222 and existing training data from snapshot database 212. Information obtained as a result of the processes described in FIG. 2D (e.g., local similarities, local dissimilarities, and remote similarities) as well as other data related to new training data 222 and/or existing training data from snapshot database 212 may be referred to as analysis results. The analysis results may include indications of portions of the existing training data on which the likely poisoned portions of new training data 222 are based on.

For example, a first sample from new training data 222 may include a synthetic image including a first portion and a second portion. The analysis results may indicate that the first portion of the first sample is substantially similar to a first sample of the existing training data. The first sample of the existing training data may include a second image. The analysis results may also indicate that the second portion of the first sample is substantially similar to a second sample of the existing training data. The second sample of the existing training data may include a third image.

Specifically, the first portion of the first sample may include a partial image of a cat and the second portion of the first sample may include a partial image of a dog. The second image (e.g., the first sample of the existing training data) may include a full image of a cat and the third image (e.g., the second sample of the existing training data) may include a full image of a dog. The first sample (e.g., the suspected poisoned sample from new training data 222) may have been generated by an attacker by combining portions of the second image and the third image. Assuming that the AI model has been previously trained using labeled images of cats and dogs, training the AI model with the synthetic image may dilute the AI model's ability to accurately classify images as including cats and/or dogs.

The analysis results may, therefore, include a list of the samples of new training data 222. For each sample of the list of the samples of new training data 222, the analysis results may include identifiers for at least one sample from the existing training data set on which the sample is suspected to be based. The analysis results may include any type and quantity of additional data (e.g., information regarding data source(s) from which new training data 222 and/or the existing training data samples were obtained).

The analysis results may be used for label identification process 240. Label identification process 240 may include identifying labels associated with samples from the existing training data on which potentially poisoned samples of new training data 222 are based. The type of attack and, therefore, the goal of the attacker, may be inferred based on a level of matching between the labels.

Therefore, label identification process 240 may include, for each sample of new training data 222, obtaining at least one identifier for the at least one sample from the existing training data set on which the sample is suspected to be based. The at least one identifier may include the sample (e.g., an image) and a label (e.g., whether the image includes a depiction of a cat or a dog). A list including the at least one label associated with the at least one sample may be compiled for each sample of the samples of new training data 222.

Specifically, a first label of the at least one label may indicate a first depiction in the second image of a cat and a second label of the at least one label may indicate a second depiction in the third image of a dog.

The labels (e.g., the first label and the second label) generated as part of label identification process 240 may be used for goal identification process 242 to identify a goal. The goal may indicate a potential impact on operation of an AI model as a result of using new training data 222 to train the AI model.

As a first example, the goal my include reinforcing an existing trend in the existing training data. Reinforcing the existing trend may bias the AI model to increase a strength of an association between features of the existing trend. Consequently, the AI model may be more likely make predictions based on the reinforced trend.

As a second example, the goal may include diluting an existing trend in the existing training data. Diluting the existing trend may make the AI model less likely to associate features of the existing trend. Consequently, the AI model may be less likely to make predictions based on the diluted trend.

Goal identification process 242 may include obtaining a level of matching between the first label and the second label. An extent to which the first label and the second label match (e.g., include the same label) may be associated with a particular goal. Specifically, goal identification process 242 may include comparing the first label and the second label to obtain the level of matching and comparing the level of matching to a threshold to classify a goal of the malicious entity.

If the level of matching exceeds the threshold, the goal may include reinforcing an existing trend in the existing training data. If the level of matching does not exceed the threshold, the goal may include diluting an existing trend in the existing training data.

Different levels of matching may be keyed to different goals other than those described (e.g., there may be any number of goals keyed to any number of levels of matching) without departing from embodiments disclosed herein.

Once the goal is classified, the goal may be used for action set generation 244 process. Different goals may be keyed to different action sets. The action set may include: (i) deleting the poisoned training data, (ii) not using the poisoned training data to update an instance of the AI model, (iii) labeling the data source(s) from which the poisoned training data was obtained as potentially compromised, (iv) filtering future new training data to look for additional samples that may align with the goal, and/or (v) any other action intended to remediate the goal.

At least one action may be selected from the remedial action set obtained as a result of action set generation 244 process. The selected action may be performed in order to update operation of the pipeline. The updated operation of the pipeline may be more likely to reduce negative effects of the attack (e.g., negative effects of the introduction of poisoned data to the pipeline, such as the generation of tainted AI models, poisoned inferences obtained from the tainted AI models, etc.). Further, the likelihood of using computing resources to remediate the negative effects of the introduction of the poisoned data may be reduced.

In an embodiment, the one or more entities performing the operations shown in FIGS. 2A-2E are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to manage AI models. FIGS. 3A-3D illustrate methods that may be performed by the components of FIG. 1. In the diagrams discussed below and shown in FIGS. 3A-3D, any of the operations may be repeated, performed in different orders, and/or performed in parallel with or in a partially overlapping in time manner with other operations.

Figure 3A:
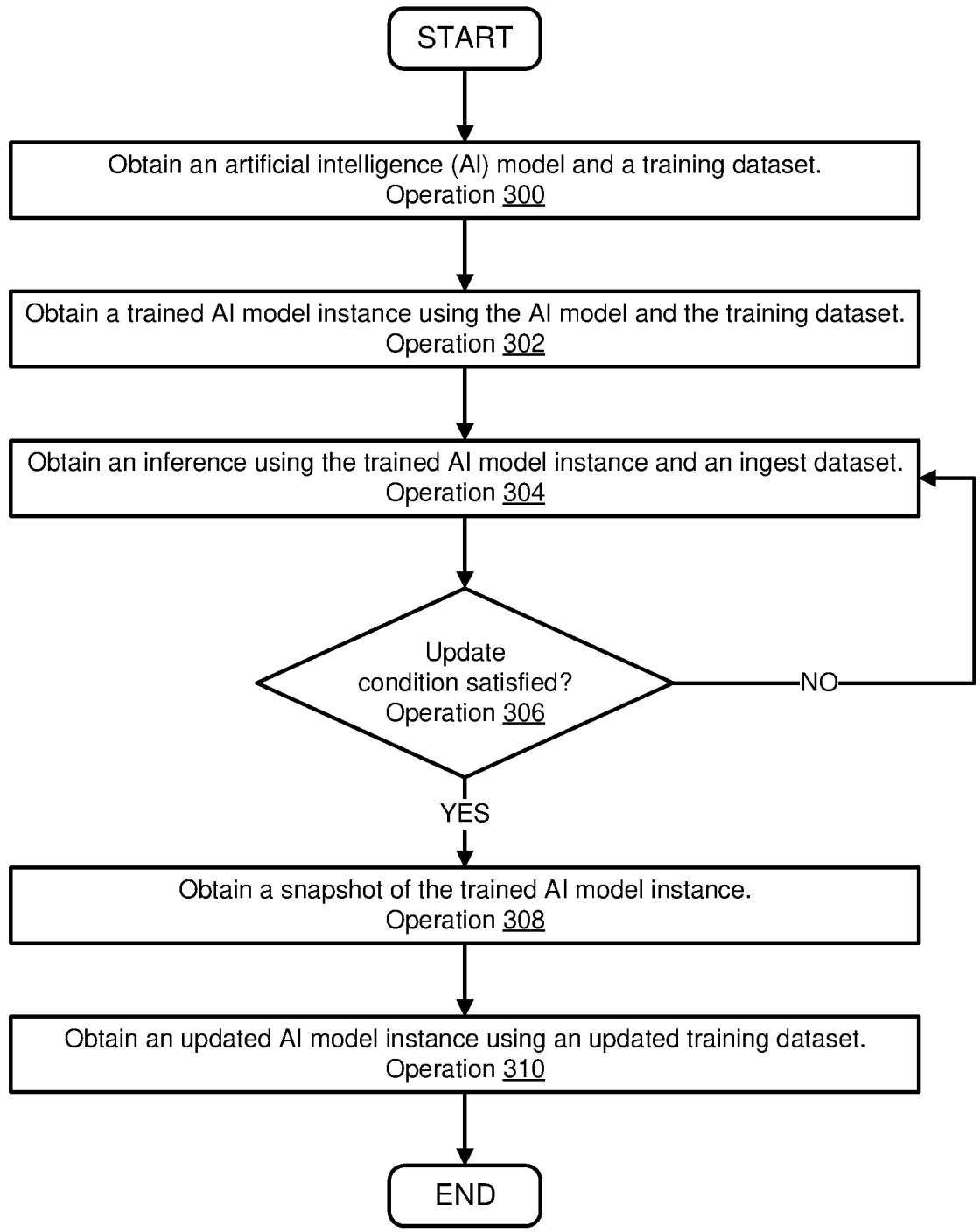
FIG. 3A shows a flow diagram illustrating a method of updating an AI model instance in accordance with an embodiment.

Turning to FIG. 3A, a flow diagram illustrating a method of updating an AI model instance in accordance with an embodiment is shown. The method may be performed by a data processing system, and/or another device.

At operation 300, an AI model and a training dataset may be obtained. The AI model may be obtained by (i) reading the AI model from storage, (ii) receiving the AI model from another device, and/or (iii) generating the AI model, for example by programming a data processing system and/or another device. The AI model may be a particular type of AI model, such as a linear regression model, a neural network, a decision tree, etc.

The type of AI model obtained may depend on the goals of inference consumers and/or other factors such as (i) training dataset characteristics (e.g., data type, size and/or complexity), (ii) cost limitations (e.g., the cost to train and/or maintain the AI model), (iii) time limitations (e.g., the time to train the AI model and/or for inference generation), and/or (iv) inference characteristics (e.g., accuracy and/or inference type). For example, a complex AI model such as a multi-layered neural network may process a large amount of complex data and generate highly accurate inferences, but may be costly to train and maintain and may have low explainability (e.g., may act as a "black box"). In contrast, a linear regression model may be a simpler, less costly AI model with high explainability, but may only be well-suited for data linearly correlated with the selected features and may generate less accurate inferences than a neural network.

Figure 3B:
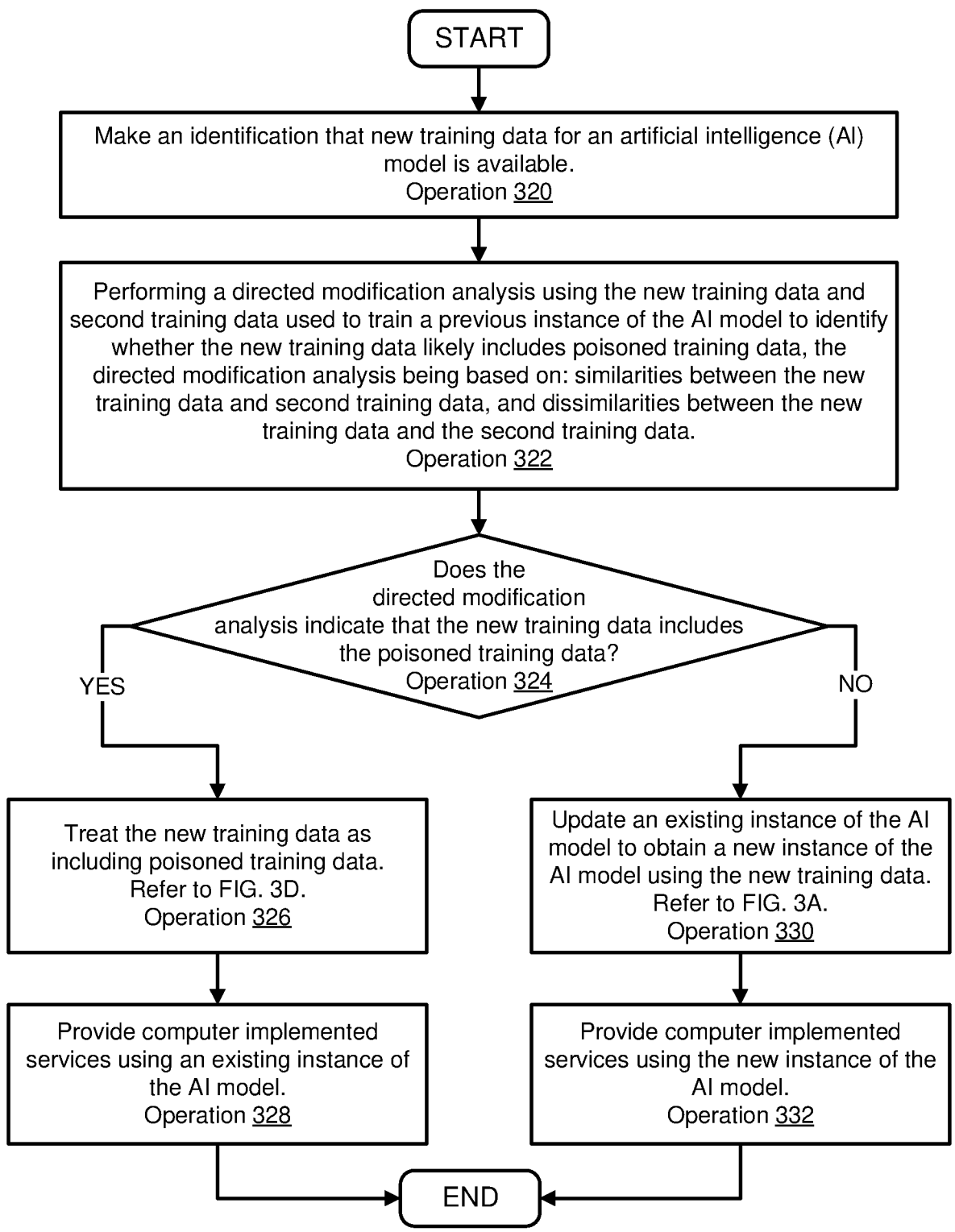
FIG. 3B shows a flow diagram illustrating a method for providing computer-implemented services in accordance with an embodiment.

The training dataset may be obtained by (i) reading the training dataset from storage, (ii) receiving the training dataset from another device, and/or (iii) generating the training dataset, for example, by gathering and measuring information from one or more data sources. The training dataset may include labeled data and/or unlabeled data. The training data included in the training dataset may be processed, cleansed and/or evaluated for quality in order to prepare the training dataset for use in training AI models. Refer to FIG. 3B for additional details regarding preparing new training data prior to use in training of AI models.

At operation 302, a trained AI model instance may be obtained using the AI model and the training dataset. The trained AI model may be obtained by training the AI model using a training system and a training dataset. Refer to FIGS. 2A-2C for additional details regarding obtaining a trained AI model.

The training system may employ machine learning techniques such as supervised learning, self-supervised learning, unsupervised learning, semi-supervised learning, etc. As part of the training process, the AI model may undergo a validation and/or testing step to improve and/or measure the reliability of generated inferences.

At operation 304, an inference may be obtained using the trained AI model instance and an ingest dataset. The inference may be obtained by feeding ingest data collected from one or more data sources to the trained AI model instance. The trained AI model instance may produce the inference as output in response to the ingest data.

The inference may be received by an AI model management system which may then provide the inference to inference consumers. An inference consumer may use the provided inference to help with decision-making and/or problem-solving. Any number of inferences may be obtained from the trained AI model instance and provided to inference consumers until the trained AI model instance is replaced with an updated AI model instance.

At operation 306, a determination may be made regarding whether an update condition is satisfied. The determination may be made by comparing characteristics of the trained AI model, characteristics of available training data (e.g., new training data), and/or other characteristics to corresponding conditions that, if met, indicate that the update condition is satisfied.

For example, the update condition may be satisfied if (i) a sufficient amount of new training data has been gathered for updating purposes (e.g., based on comparison to a training data threshold), (ii) the AI model inference accuracy is unsatisfactory (e.g., based on a comparison to an inference accuracy threshold), (iii) an AI model is updated according to a schedule that fits business needs (e.g., based on a comparison between when the trained AI model was last updated and the current point in time), and/or (iv) other basis of comparison between the current characteristics of the AI model, training data, etc.

If at operation 306 the update condition is not satisfied, then the method may return to operation 304 (e.g., thereby allowing for another inference to be obtained using the currently trained AI model instance and available ingest data). However, if the update condition is satisfied, then the method may proceed to operation 308.

At operation 308, a snapshot of the trained AI model instance may be obtained. The snapshot of the trained AI model instance may be obtained by (i) reading the snapshot from storage, (ii) obtaining the snapshot from another device, and/or (iii) by generating the snapshot.

The snapshot may be generated by storing, in a non-transitory storage medium, (i) a copy of the structure of the instance of the AI model, (ii) metadata for the inferences obtained from the instance of the AI model, the metadata indicating an inference consumer that has consumed the inference, (iii) a copy of the portion (and/or metadata for accessing an archived portion) of the training dataset used to train the instance of the AI model, (iv) metadata identifying data sources from which training data has been collected, and/or (v) metadata identifying the input (e.g., the ingest data) used to generate the inference.

The structure of the instance of the AI model may be stored by (i) storing a copy of the architecture of the AI model and parameters (e.g., weights for the hidden layers) that may change as the AI model is modified over time, or (ii) storing a reference to the architecture (if previously stored) and the parameters of the AI model. For example, when first stored, both the architecture of the AI model (e.g., which may include a description of the neurons, bias function descriptions, activation function descriptions, etc.) and the parameters may be stored. However, as the AI model is evolved, the structure may be stored as part of the snapshot by merely referencing the existing stored architecture and storing the changed parameters.

The parameters may include, for example, a weight of a first element in a hidden layer of the instance of the AI model (e.g., the process may be extended until all weights for the instance of the AI model are stored). Additionally, metadata regarding the structure of the instance of the AI model may also be stored to facilitate identification of the instance of the AI model and/or for other purposes.

An initial snapshot of an AI model may include information that may remain static throughout the life of the AI model (e.g., the structure of the AI model), whereas subsequent snapshots may only include dynamic information (e.g., weights).

The metadata for the inference may be stored by storing (i) an identifier for an input used to obtain the inference, (ii) an identifier for the inference, (iii) identification information for the inference consumer, (iv) a time stamp indicating when the inference was generated, and/or (v) other attributes of the inference (e.g., confidence scores).

By storing the snapshot of an AI model instance, the snapshot may be used to (i) reduce the computational costs for reverting a poisoned AI model instance to a previous AI model instance that is unpoisoned (e.g., not trained using poisoned data), (ii) mitigate the effects of a poisoned inference provided to inference consumers, (iii) identify a malicious entity and/or a goal of a malicious entity that has supplied poisoned training data (refer to the discussion of FIG. 3B), and/or (iv) purge poisoned training data from a training data repository to avoid poisoning any updated AI models that may be updated (e.g., trained) using the poisoned training data. However, if poisoned training data is not identified, AI models may be continuously updated (e.g., trained) as updated training data (e.g., new training data) is made available.

At operation 310, an updated AI model instance may be obtained using an updated training dataset. The updated AI model instance may be obtained by further training (e.g., updating) the trained AI model instance based on an updated training dataset and using a training system. The updated training dataset may include newly acquired training data (e.g., training data that has not already been used to train the trained AI model instance and that has survived screening, described with respect to FIG. 3B).

The training system may employ machine-learning methods such as incremental learning, which may allow an additional training step as new training data becomes available to be performed, and may adjust what has already been learned by the AI model according to the new training data. Traditional machine learning methods may assume the availability of a sufficient training dataset before the first training process begins and may not allow for adjustments when only new training data is introduced. In either case, at the time poisoned training data is introduced into the training dataset, the subsequently trained and/or updated AI models may be affected by the poisoned training data, requiring reverting to an AI model that has not been trained using poisoned training data and/or otherwise removing the impact of the poisoned training data on the trained AI model instance.

The method may end following operation 310.

Using the method illustrated in FIG. 3A, a system in accordance with embodiments disclosed herein may be placed in condition to mitigate the impact of poisoned training data through proactive preparation for model revision, retraining, and poisoned inference identification.

Figure 3C:
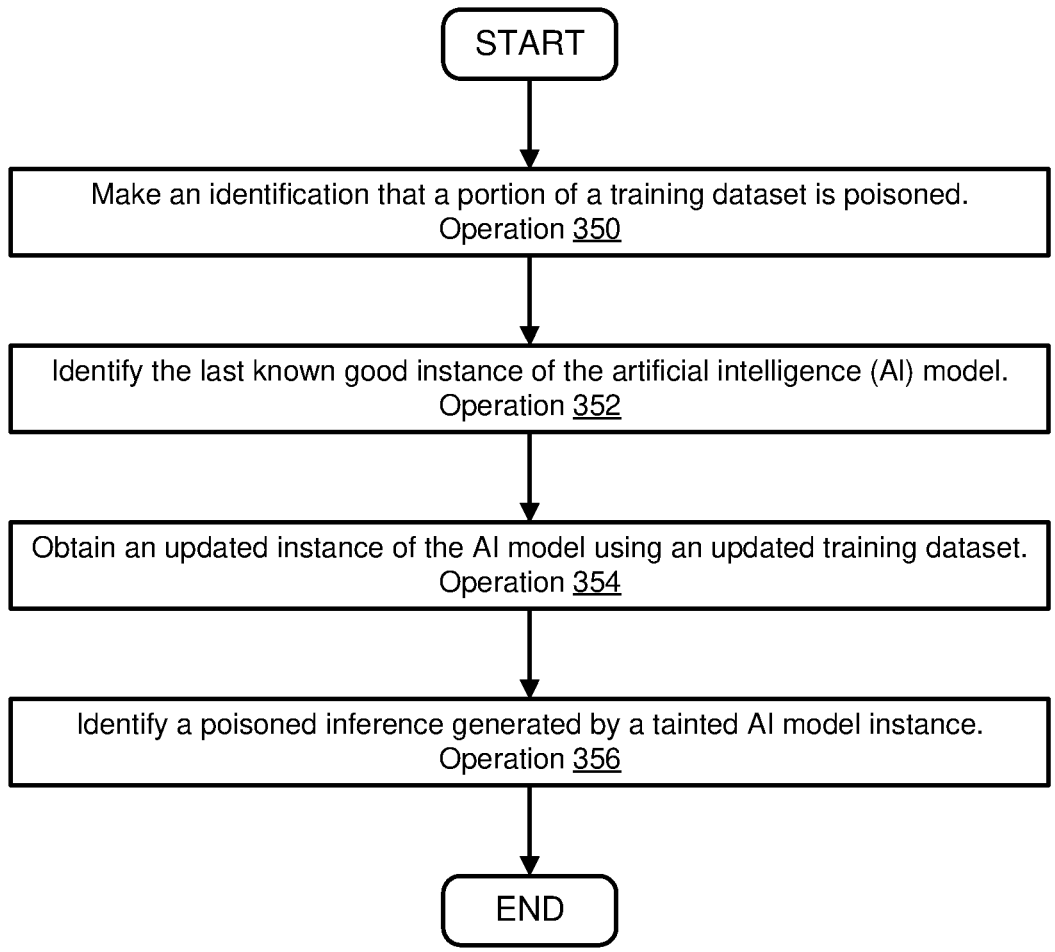
FIG. 3C shows a flow diagram illustrating a method of managing poisoned training data in accordance with an embodiment.

However, remediating the impact of poisoned training data may be computationally expensive. Refer to FIG. 3C for additional details regarding remediating AI models that have been poisoned. To reduce the computational cost for providing untainted inferences, a system in accordance with an embodiment may attempt to proactively prevent poisoned training data from being used to update AI models.

Turning to FIG. 3B, a flow diagram illustrating a method for providing computer-implemented services using AI models in accordance with an embodiment is shown. The method may be performed by a data processing system, and/or another device.

At operation 320, an identification may be made that new training data for an AI model is available. The identification may be made by monitoring when new training data becomes available. The new training data may become available, for example, when ingest data is obtained and used to obtain an inference or when new training data is provided by a data source. The identification may be made similarly to as described with respect to operation 306.

At operation 322, a directed modification analysis may be performed using the training data and second training data used to train a previous instance of the AI model to identify whether the new training data likely includes poisoned training data. The directed modification analysis may be based on similarities between the new training data and the second training data, and dissimilarities between the new training data and the second training data.

The directed modification analysis may be performed by, for each portion of the new training data, (i) performing a similarity analysis to identify local similarities (e.g., matching sub-portions) between the portion and portions of the second training data, (ii) performing a dissimilarity analysis to identify local dissimilarities (e.g., sub-portions that are starkly different) between the portion of the new training data and portions of the second training data for which local similarities are identified, and (iii) performing a remote similarity analysis to identify local similarities between the portion of the second training data and portions of the second training data excluding any portions for which local similarities are found (e.g., in other words, other similarities with other portions of training data, thereby establishing a set of at least the portion of the new training data and two different portions of the second training data that include local similarities). The numbers of local similarities, local dissimilarities, and remote similarities to ascertain whether the portion of the new training data is likely synthetic. For example, thresholds for each of the quantities (and/or other criteria) may be used ascertain whether these quantities indicate that the portion of the new training data is likely synthetic.

To be treated as likely being synthetic, the thresholds may require that (i) at least one local similarity is present and at least one local dissimilarity is present (e.g., the portion includes a sub-portion that matches a sub-portion of previous training data but also be quite dissimilar in at least one sub-portion), (ii) at least one local similarity and at least one remote similarity is present (e.g., the portion includes two sub-portions that match sub-portions of different portions of the previous training data), and/or (iii) at least one local similarity, one local dissimilarity, and at least one remote similarity is present (e.g., the portion includes two sub-portions that match sub-portions of different portions of the previous training data and at least one sub-portion that is dissimilar to one sub-portion of one of the portion of the previous training data to which one of the two sub-portions matched).

At operation 324, a determination may be made regarding whether the directed modification analysis indicates that the new training data includes the poisoned training data. The determination may be made based on the result provided by the directed modification analysis.

If it is determined that the new training data includes the poisoned training data, then the method may proceed to operation 326. Otherwise, the method may proceed to operation 330 (e.g., which indicates that the new training data is unlikely to include poisoned training data).

At operation 326, the new training data may be treated as including poisoned training data. The new training data may be treated as including poisoned training data by (i) screening the portions of the training data identified as including poisoned training data from being integrated into the training data repository and/or used to update AI models, and (ii) performing remedial actions to reduce the likelihood of new poisoned training data from being used in the future.

For example, the remedial action may include (i) flagging a source of the new training data as potentially being compromised, (ii) submitting the identified poisoned training data for additional analysis by a subject matter expert to confirm that the new training data does include poisoned training data (the training data may be unlabeled, the subject matter expert may label it and/or otherwise analyze it), and/or (iii) other types of actions to reduce the likelihood of poisoned training data being used in the future may be performed.

At operation 328, computer-implemented services may be provided using an existing instance of the AI model (e.g., not trained using the new training data, may be a most current instance of the AI model or a previous instance). The computer-implemented services may be provided by (i) obtaining new ingest data, (ii) generating an inference using the new ingest data and the existing instance of the AI model, and (iii) providing the inference to a downstream consumer that uses the inference to provide the computer-implemented services.

The method may end following operation 328.

Returning to operation 324, the method may proceed to operation 330 following operation 324 when the training data is unlikely to include poisoned training data.

At operation 330, an existing instance of the AI model may be updated to obtain a new instance of the AI model using the new training data. The new instance of the AI model may be obtained by further training of the existing instance of the AI model with the new training data. Refer to operation 310 for additional details regarding additional training of AI models using new training data.

At operation 332, computer-implemented services may be provided using the new instance of the AI model (e.g., trained using the new training data). The computer-implemented services may be provided by (i) obtaining new ingest data, (ii) generating an inference using the new ingest data and the new instance of the AI model, and (iii) providing the inference to a downstream consumer that uses the inference to provide the computer-implemented services.

The method may end following operation 332.

Using the method illustrated in FIG. 2B, poisoned training data may be less likely to be used to train AI models. However, when used to train AI models prior to being identified, the impact of poisoned training data may be managed through reversion and retraining, as discussed below with respect to FIG. 3C.

Turning to FIG. 3C, a flow diagram illustrating a method of managing poisoned training data in accordance with an embodiment is shown. The method may be performed by a data processing system, and/or another device.

At operation 350, an identification may be made that a portion of a training dataset is poisoned. The identification may be made by (i) receiving the identification from another entity, (ii) reading the identification from storage, and/or (iv) making the identification. The identification may be made, for example, by performing various analysis of attributes of AI model instances, of training data and/or operation of entities from which the training data may be obtained.

At operation 352, the last known good instance of the AI model may be identified. The last known good instance of the AI model may be identified by identifying the first AI model instance trained using the poisoned training dataset, identifying a second AI model instance trained before the first AI model instance (e.g., that is not trained using the poisoned training dataset), and using the second AI model instance as the last known good instance of the AI model.

At operation 354, an updated instance of the AI model may be obtained using an updated training dataset. The updated training dataset may be obtained by reading training data from an updated training data repository. The updated training data repository may be obtained by removing the identified poisoned training dataset (e.g., from operation 350) from an existing training data repository so that the updated training repository may be free of poisoned training data.

The updated instance of the AI model may be obtained by further training (e.g., updating) the last known good instance of the AI model from operation 352. The updated instance of the AI model may be trained to relate pieces of data from the updated training dataset from operation 354, using a training system, (e.g., analogous to operations 302 and 310). The resulting trained updated instance of the AI model may be used to obtain unpoisoned inferences (e.g., replacement inferences and/or new inferences).

At operation 356, a poisoned inference may be identified. The poisoned inference may be a hard example and/or may be identified by accessing information stored in a snapshot of a tainted AI model instance. The snapshot of the tainted AI model instance may include associations (e.g., stored metadata) between the tainted AI model and any inference (e.g., a poisoned inference) generated by the tainted AI model. Once identified, the poisoned inference may be remediated.

The poisoned inference may be remediated by (i) notifying an inference consumer that consumed the poisoned inference, of the poisoned inference, (ii) obtaining a replacement inference (e.g., using the last known good instance of the AI model and the ingest dataset used to obtain the poisoned inference), (iii) providing the replacement inference to an inference consumer that consumed the poisoned inference, (iv) deleting the poisoned inference from an inference repository, and/or (v) retaining the unpoisoned inference.

The method may end following operation 356.

Using the method illustrated in FIG. 3C, a system in accordance with an embodiment may reduce the impact of poisoned training data through model reversion, retraining, and/or remediation.

Figure 3D:
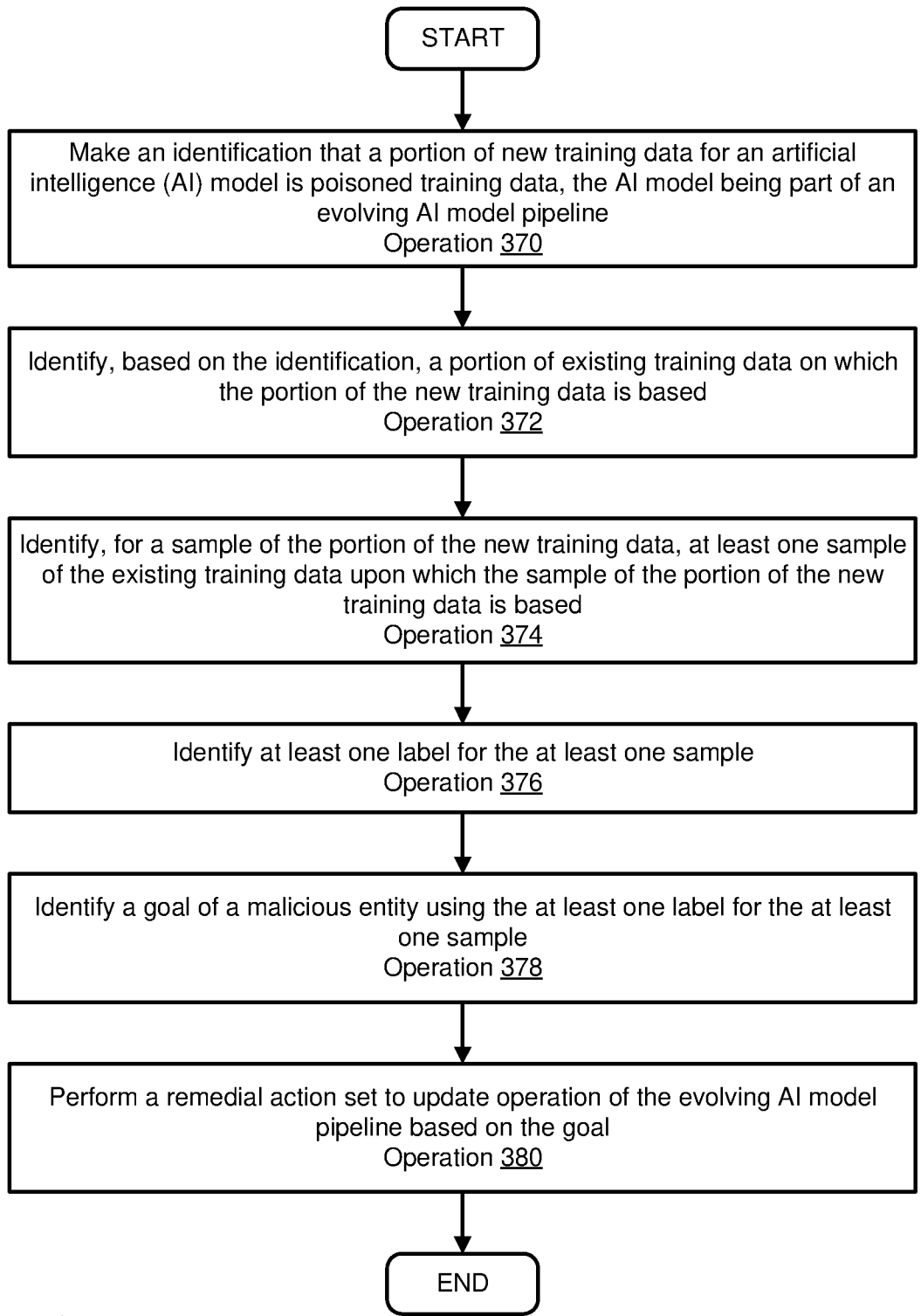
FIG. 3D shows a flow diagram illustrating a method of managing an attack in accordance with an embodiment.

Turning to FIG. 3D, a flow diagram illustrating a method of managing an attack in accordance with an embodiment is shown. The method may be performed by a data processing system, and/or another device. The attack may be initiated by an attacker, for example, and may be directed toward an AI model that may be part of a pipeline (e.g., an evolving AI model pipeline). For example, the attacker may initiate introduction of poisoned training data to the pipeline in an attempt to poison (e.g., taint) the AI model and any subsequent inferences obtained from the AI model.

At operation 370, an identification that a portion of new training data for the AI model is poisoned training data may be made. The identification may be made by (i) receiving the identification from another entity, (ii) reading the identification from storage, and/or (iii) making the identification. The identification may be made, for example, by performing various analyses of attributes of AI model instances, of training data and/or of operation of entities (e.g., data sources) from which the training data may be obtained. For example, the identification may be made by screening training data using directed modification analysis (as discussed with respect to FIGS. 2D and 3B).

At operation 372, a portion of existing training data on which the portion of the new training data is based may be identified based on the identification. Identifying the portion of the existing training data on which the portion of the new training data is based may include: (i) reading the portion of the existing training data from storage, the portion of the existing training data being labeled as associated with the portion of the new training data, (ii) receiving the portion of the existing training data from another entity (e.g., in the form of a message over a communication system), the entity being responsible for identifying the portion of the existing training data, (iii) generating the portion of the existing training data, and/or (iv) other methods.

Generating the portion of the existing training data may include comparing each sample of the new training data to samples from the existing training data. The comparison process may include, for example, a directed modification analysis process to identify similarities between portions of each sample of the new training data and portions of samples of the existing training data. Refer to operation 322 for further information regarding identifying the portion of the existing training data on which the portion of the new training data is based.

At operation 374, for a sample of the portion of the new training data, at least one sample of the existing training data upon which the sample of the portion of the new training data is based may be identified. Identifying the at least one sample of the existing training data upon which the sample of the portion of the new training data is based may include: (i) identifying a first sample of the existing training data that includes a portion that is substantially similar (and/or equivalency in how the model perceives it) to a first portion of the sample of the portion of the new training data, (ii) identifying a second sample of the existing training data that includes a portion that is substantially similar to a second portion of the sample of the portion of the new training data, and/or (iii) other methods.

Identifying the first sample of the existing training data may include at least a portion of the methods described in operation 322 in FIG. 3B with respect to the directed modification analysis. Specifically, identifying the first sample of the existing training data may include: (i) selecting the sample of the portion of the new training data, (ii) segmenting the sample of the portion of the new training data into portions; (iii) comparing each of the portions (e.g., via the directed modification analysis process) to samples of the existing training data to identify one or more potential matching samples, (iv) treating one of the one or more potential matching samples as the first sample, and/or (v) other methods.

The first sample may be identified via other methods of identifying similarities between portions of data without departing from embodiments disclosed herein.

Identifying the second sample of the existing training data may also include at least a portion of the methods described in operation 322 in FIG. 3B with respect to the directed modification analysis. Specifically, identifying the second sample of the existing training data may include treating another one of the one or more potential matching samples described above as the second sample, the second sample being different from the first sample.

The second sample may be identified via other methods of identifying similarities between portions of data without departing from embodiments disclosed herein.

For example, the sample of the new training data may include an image. The image may be segmented into two portions. A first portion of the two portions may be compared to existing training data samples to identify a first existing training data sample on which the first portion was likely based. Similarly, the second portion of the two portions may be compared to the existing training data samples to identify a second existing training data sample on which the second portion was likely based. While described with respect to a matching process using two portions, it will be appreciated that similarity may be identified via other methods without departing from embodiments disclosed herein. For example, sequence alignment may be used to identify the similarity.

It may be determined that the first portion is based on a second image and that the second portion is based on a third image, the second image and the third image being members of the existing training data set.

Specifically, the second image may depict an image of a cat and the third image may depict an image of a dog. The first portion of the image from the new training data set may include a first half of the image of the cat (e.g., the second image) and the second portion of the image from the new training data set may include a second half of the image of the dog (e.g., the third image).

At operation 376, at least one label for the at least one sample may be identified. Identifying the at least one label for the at least one sample may include: (i) obtaining a list of samples of the existing training data set and corresponding labels for each sample of the list of the samples, (ii) identifying a first label corresponding to the first sample, (iii) identifying a second label corresponding to the second sample, and/or (iv) other methods. Any number of labels may be identified for any number of the at least one sample.

Identifying the at least one label for the at least one sample may include: (i) reading the at least one label from storage, (ii) receiving the at least one label from another entity responsible for retrieving the samples, and/or (iii) generating the at least one label via analysis of the existing training data sets.

At operation 378, a goal of a malicious entity may be identified using the at least one label for the at least one sample. Identifying the goal of the malicious entity may include: (i) classifying the goal based on a level of matching of a first label of the at least one label and a second label of the at least one label, (ii) reading the goal from storage, (iii) providing the level of matching to another entity and receiving the goal in response from the entity (e.g., in the form of a transmission over a communication system), and/or (iv) via other methods.

Classifying the goal may include comparing the level of matching of the first label and the second label to a threshold. Comparing the level of matching to the threshold may include: (i) obtaining the threshold, (ii) comparing a numerical quantity associated with the level of matching to a numerical quantity associated with the threshold, and/or (iii) other methods.

Obtaining the threshold may include: (i) reading the threshold from storage, (ii) receiving the threshold from another entity, (iii) generating the threshold based on preferences of a downstream consumer of inferences generated by the AI model, and/or (iv) other methods.

In an instance of the comparing where the level of matching exceeds the threshold, classifying the goal may include concluding that the goal is to reinforce an existing trend in the existing training data. Concluding that the goal is to reinforce an existing trend in the existing training data may include obtaining a classification schema for the goal, the classification schema indicating different goals based on a result of the comparison of the level of matching to the threshold. For example, the classification schema for the goal may indicate that a first goal may be the goal if the level of matching exceeds the threshold, and a second goal may be the goal if the level of matching does not exceed the threshold.

Similarly, in an instance of the comparing where the level of matching does not exceed the threshold, classifying the goal may include concluding that the goal is to dilute an existing trend in the existing training data. Concluding that the goal is to dilute an existing trend in the existing training data may include obtaining the classification schema for the goal, the classification schema indicating different goals based on the result of the comparison of the level of matching to the threshold. For example, the classification schema for the goal may indicate that a first goal may be the goal if the level of matching exceeds the threshold, and a second goal may be the goal if the level of matching does not exceed the threshold.

While described above with respect to a single threshold and two potential goals, any number of thresholds may be keyed to any number of goals without departing from embodiments disclosed herein.

At operation 380, a remedial action set may be performed to update operation of the evolving AI model pipeline based on the goal. Performing the remedial action set may include: The remedial action set may be performed by (i) obtaining the remedial action set, (ii) selecting at least one action for the remedial action set (e.g., based on the goal), and/or (iii) initiating performance of the at least one action.

The remedial action set may be obtained by (i) receiving the remedial action set from an entity, (ii) reading the remedial action set from storage, and/or (iii) generating the remedial action set. For example, the action set may be generated based on the architecture, security, and/or functionality of the pipeline. The remedial action set may include any number of actions usable to update, suspend, and/or modify operation of the pipeline.

The remedial action set (e.g., the at least one action of the remedial action set) may be performed by (i) initiating performance of the remedial action set (e.g., sending instructions for selected actions of the remedial action set to a data processing system that manages operation of the pipeline), and/or (ii) monitoring performance of the remedial action set. For example, a user of a data processing system may generate the instructions for performing actions of the remedial action set (e.g., by writing the computer instructions using information regarding the poisoned training data such as data source identifiers, etc.), and/or may prompt a data processing to generate the instructions for performing the actions.

The method may end following operation 380.

Using the method illustrated in FIG. 3D, a system in accordance with an embodiment may proactively reduce the likelihood of obtaining poisoned training data in the future through the analysis of previously obtained and identified poisoned training data.

Figure 4:
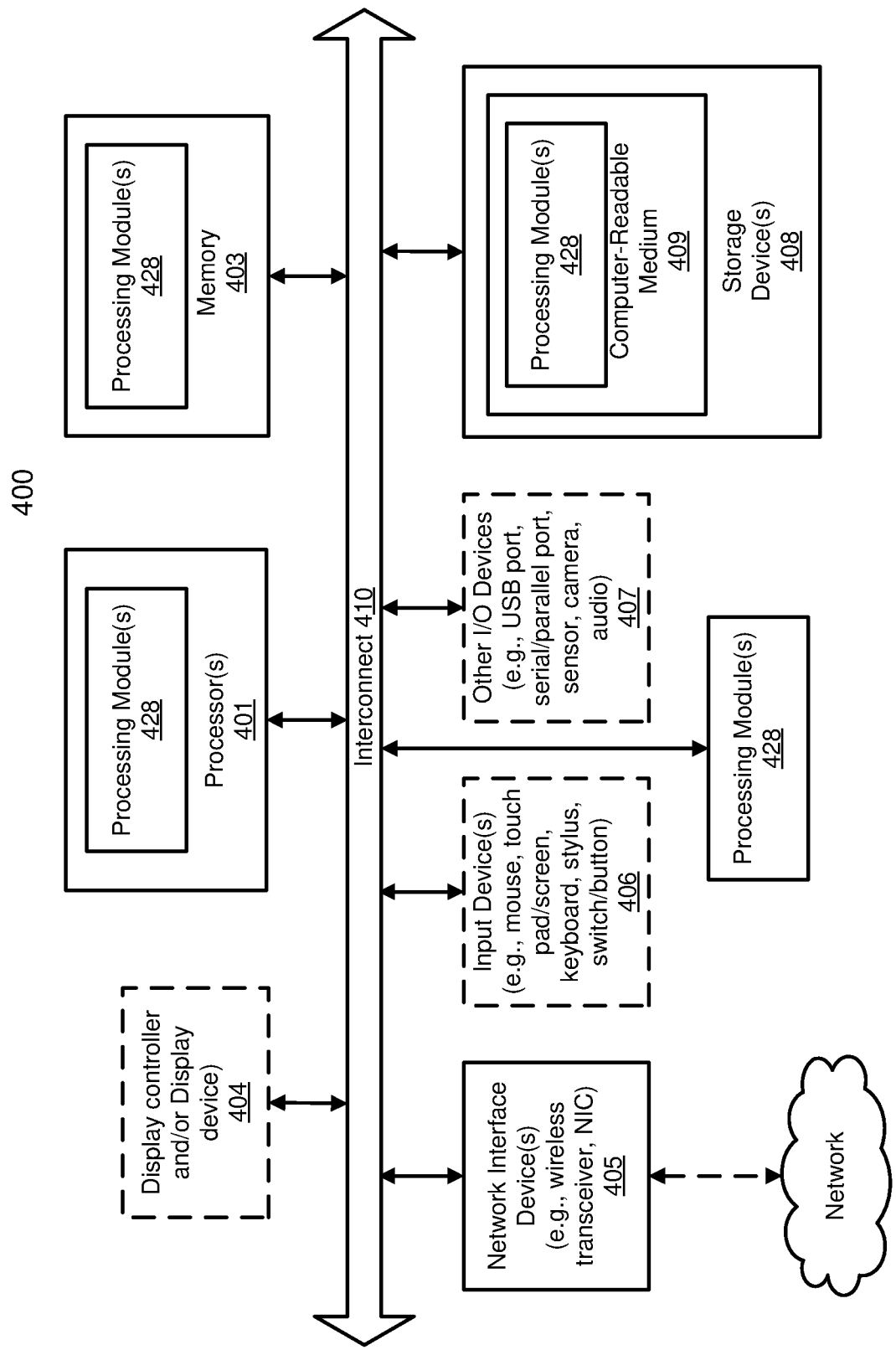
FIG. 4 shows a block diagram illustrating a data processing system in accordance with an embodiment.

Any of the components illustrated in FIGS. 1-3D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing an artificial intelligence (AI) model, comprising:
   determining that a portion of new training data for the AI model contains poisoned training data, the AI model being part of an evolving AI model pipeline; and
   after determining that the portion of new training data contains the poisoned training data:
      identifying a portion of existing training data on which the portion of the new training data that has been determined as containing the poisoned training data is based;
      for a sample of the portion of the new training data that has been determined as containing the poisoned training data, identifying at least one sample of the existing training data upon which the sample of the portion of the new training data is based;
      identifying at least one label for the at least one sample;
      identifying a goal of a malicious entity using the at least one label for the at least one sample; and
      performing a remedial action set to update operation of the evolving AI model pipeline based on the goal.

2. The method of claim 1, wherein identifying the at least one sample of the existing training data upon which the sample of the portion of the new training data that has been determined as containing the poisoned training data is based comprises:
   for the sample of the portion of the new training data that has been determined as containing the poisoned training data:
      identifying a first sample of the existing training data that comprises a portion that is substantially similar to a first portion of the sample of the portion of the new training data that has been determined as containing the poisoned training data.

3. The method of claim 2, wherein identifying the at least one sample of the existing training data upon which the sample of the portion of the new training data is based further comprises:
   further for the sample of the portion of the new training data:
      identifying a second sample of the existing training data that comprises a portion that is substantially similar to a second portion of the sample of the portion of the new training data.

4. The method of claim 3, wherein the first portion of the sample of the portion of the new training data that has been determined as containing the poisoned training data is a first portion of a first image, and the second portion of the sample of the portion of the new training data that has been determined as containing the poisoned training data is a second portion of the first image.

5. The method of claim 3, wherein the first sample is a second image, the second sample is a third image, and a first label of the at least one label indicates a first depiction in the second image and a second label of the at least one label indicates a second depiction in the third image.

6. The method of claim 5, wherein identifying the goal of the malicious entity comprises:
   classifying the goal based on a level of matching of the first label and the second label.

7. The method of claim 6, wherein classifying the goal comprises:
   comparing the level of matching of the first label and the second label to a threshold;
   in a first instance of the comparing where the level of matching exceeds the threshold:
      concluding that the goal is to reinforce an existing trend in the existing training data; and
   in a second instance of the comparing where the level of matching does not exceed the threshold:
      concluding that the goal is to dilute an existing trend in the existing training data.

8. The method of claim 1, wherein the evolving AI model pipeline provides inferences to inference consumers using AI models, and the new training data was scheduled for use in updating the AI models prior to the identification being made.

9. A non-transitory machine-readable medium having instructions stored therein, which when executed by a processor, cause the processor to perform operations for managing an artificial intelligence (AI) model, the operations comprising:
   determining that a portion of new training data for the AI model is poisoned training data, the AI model being part of an evolving AI model pipeline; and
   after determining that the portion of new training data contains the poisoned training data:
      identifying a portion of existing training data on which the portion of the new training data that has been determined as containing the poisoned training data is based;
      for a sample of the portion of the new training data that has been determined as containing the poisoned training data, identifying at least one sample of the existing training data upon which the sample of the portion of the new training data is based;

identifying at least one label for the at least one sample;

identifying a goal of a malicious entity using the at least one label for the at least one sample; and performing a remedial action set to update operation of the evolving AI model pipeline based on the goal.

10. The non-transitory machine-readable medium of claim 9, wherein identifying the at least one sample of the existing training data upon which the sample of the portion of the new training data that has been determined as containing the poisoned training data is based comprises:

for the sample of the portion of the new training data that has been determined as containing the poisoned training data:

identifying a first sample of the existing training data that comprises a portion that is substantially similar to a first portion of the sample of the portion of the new training data that has been determined as containing the poisoned training data; and identifying a second sample of the existing training data that comprises a portion that is substantially similar to a second portion of the sample of the portion of the new training data that has been determined as containing the poisoned training data.

11. The non-transitory machine-readable medium of claim 10, wherein the first portion of the sample of the portion of the new training data that has been determined as containing the poisoned training data is a first portion of a first image, and the second portion of the sample of the portion of the new training data that has been determined as containing the poisoned training data is a second portion of the first image.

12. The non-transitory machine-readable medium of claim 11, wherein the first sample is a second image, the second sample is a third image, and a first label of the at least one label indicates a first depiction in the second image and a second label of the at least one label indicates a second depiction in the third image.

13. The non-transitory machine-readable medium of claim 12, wherein identifying the goal of the malicious entity comprises:

classifying the goal based on a level of matching of the first label and the second label.

14. The non-transitory machine-readable medium of claim 13, wherein classifying the goal comprises:

comparing the level of matching of the first label and the second label to a threshold;

in a first instance of the comparing where the level of matching exceeds the threshold:

concluding that the goal is to reinforce an existing trend in the existing training data; and in a second instance of the comparing where the level of matching does not exceed the threshold:

concluding that the goal is to dilute an existing trend in the existing training data.

15. The non-transitory machine-readable medium of claim 9, wherein the evolving AI model pipeline provides inferences to inference consumers using AI models, and the new training data was scheduled for use in updating the AI models prior to the identification being made.

16. A data processing system, comprising:

a processor; and a memory coupled to the processor to store instructions, which when executed by the processor, cause the processor to perform operations for managing an artificial intelligence (AI) model, the operations comprising:

determining that a portion of new training data for the AI model contains poisoned training data, the AI model being part of an evolving AI model pipeline; and after determining that the portion of new training data contains the poisoned training data:

identifying a portion of existing training data on which the portion of the new training data that has been determined as containing the poisoned training data is based;

for a sample of the portion of the new training data that has been determined as containing the poisoned training data, identifying at least one sample of the existing training data upon which the sample of the portion of the new training data is based;

identifying at least one label for the at least one sample;

identifying a goal of a malicious entity using the at least one label for the at least one sample; and performing a remedial action set to update operation of the evolving AI model pipeline based on the goal.

17. The data processing system of claim 16, wherein identifying the at least one sample of the existing training data upon which the sample of the portion of the new training data that has been determined as containing the poisoned training data is based comprises:

for the sample of the portion of the new training data that has been determined as containing the poisoned training data:

identifying a first sample of the existing training data that comprises a portion that is substantially similar to a first portion of the sample of the portion of the new training data that has been determined as containing the poisoned training data; and identifying a second sample of the existing training data that comprises a portion that is substantially similar to a second portion of the sample of the portion of the new training data that has been determined as containing the poisoned training data.

18. The data processing system of claim 17, wherein the first portion of the sample of the portion of the new training data that has been determined as containing the poisoned training data is a first portion of a first image, and the second portion of the sample of the portion of the new training data that has been determined as containing the poisoned training data is a second portion of the first image.

19. The data processing system of claim 18, wherein the first sample is a second image, the second sample is a third image, and a first label of the at least one label indicates a first depiction in the second image and a second label of the at least one label indicates a second depiction in the third image.

20. The data processing system of claim 19, wherein identifying the goal of the malicious entity comprises:

classifying the goal based on a level of matching of the first label and the second label.

* * * * *